(12) United States Patent
Daicho et al.

(10) Patent No.: US 11,397,959 B2
(45) Date of Patent: Jul. 26, 2022

(54) INFORMATION PROCESSING DEVICE, INFORMATION PROCESSING TERMINAL, AND INFORMATION PROCESSING METHOD

(71) Applicant: FeliCa Networks, Inc., Tokyo (JP)

(72) Inventors: Makoto Daicho, Kanagawa (JP); Motohiro Oohama, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 8 days.

(21) Appl. No.: 17/058,254

(22) PCT Filed: May 17, 2019

(86) PCT No.: PCT/JP2019/019625
§ 371 (c)(1),
(2) Date: Nov. 24, 2020

(87) PCT Pub. No.: WO2019/230440
PCT Pub. Date: Dec. 5, 2019

(65) Prior Publication Data
US 2021/0182891 A1 Jun. 17, 2021

(30) Foreign Application Priority Data
Jun. 1, 2018 (JP) .............................. JP2018-105751

(51) Int. Cl.
*G06Q 30/02* (2012.01)
*G06Q 10/04* (2012.01)
*G06Q 10/10* (2012.01)

(52) U.S. Cl.
CPC ....... *G06Q 30/0209* (2013.01); *G06Q 10/047* (2013.01); *G06Q 10/107* (2013.01)

(58) Field of Classification Search
USPC .................................................. 705/14.1, 319
See application file for complete search history.

(56) References Cited

U.S. PATENT DOCUMENTS

| | | | | |
|---|---|---|---|---|
| 2013/0297416 A1* | 11/2013 | Dipaola | .............. | H04W 12/065 |
| | | | | 705/14.58 |
| 2014/0058818 A1* | 2/2014 | Drozd | .................... | G06Q 20/20 |
| | | | | 705/14.26 |

(Continued)

FOREIGN PATENT DOCUMENTS

| | | |
|---|---|---|
| JP | 2002-092740 A | 3/2002 |
| JP | 2005-011116 A | 1/2005 |

(Continued)

OTHER PUBLICATIONS

Understanding learning within a commercial video game (Year: 2014).*
Stylized_facts_for_mobile_game_analytics (Year: 2016).*

*Primary Examiner* — Gautam Ubale
(74) *Attorney, Agent, or Firm* — Paratus Law Group, PLLC

(57) ABSTRACT

The present disclosure relates to an information processing device, an information processing terminal, and an information processing method that can effectively perform a promotion measure. Provided is an information processing device including: an information acquisition unit that acquires a transaction history between one or a plurality of electronic commerce business operators and a user; a determination unit that determines whether the user satisfies a predetermined condition on the basis of the acquired transaction history; and an incentive giving unit that gives the user a right to execute a game in which points can be given according to a result via an information processing terminal used by the user on the basis of a determination result.

13 Claims, 24 Drawing Sheets

(56) References Cited

U.S. PATENT DOCUMENTS

| | | | | |
|---|---|---|---|---|
| 2014/0149196 A1* | 5/2014 | Drozd | ............... | G06Q 20/3276 |
| | | | | 705/14.21 |
| 2016/0148241 A1* | 5/2016 | Walsh | ............... | G06Q 30/0238 |
| | | | | 705/14.26 |
| 2020/0143405 A1* | 5/2020 | Tucker | .................... | G06F 21/10 |
| 2020/0219080 A1* | 7/2020 | Graham | ................ | G06Q 40/12 |

FOREIGN PATENT DOCUMENTS

| | | |
|---|---|---|
| JP | 2007-242009 A | 9/2007 |
| JP | 2008-112336 A | 5/2008 |
| JP | 2008-225968 A | 9/2008 |
| JP | 2009-223688 A | 10/2009 |
| JP | 2010-079804 A | 4/2010 |
| JP | 2012-181652 A | 9/2012 |
| JP | 2014-006596 A | 1/2014 |
| JP | 2016-139249 A | 8/2016 |
| JP | 2018-169646 A | 11/2018 |
| WO | WO 2017/037890 A1 | 3/2017 |

* cited by examiner

| REGISTRATION CONTENT |
| --- |
| USER ID |
| PURCHASE DATE AND TIME |
| PURCHASE DAY OF WEEK |
| PURCHASE STORE |
| PURCHASED PRODUCT CATEGORY |
| PURCHASED PRODUCT NAME |
| TOTAL PURCHASE AMOUNT |
| NUMBER OF COMBINATIONS OF PURCHASED PRODUCT CATEGORY |
| PAYMENT METHOD (CASH/CREDIT CARD/ELECTRONIC MONEY) |
| PAYMENT MEDIUM TYPE (CARD/MOBILE) |
| MEMBERSHIP RANK |
| MEMBER NUMBER |
| NUMBER OF TIMES OF PURCHASE |
| DETERMINATION OF INITIAL PURCHASE |

| | |
|---|---|
| PURCHASE PERIOD | FEBRUARY 1, 2018 TO APRIL 30, 2018 |
| PURCHASE DAY OF WEEK | NO LIMITATION |
| PURCHASE STORE | ALL REAL STORES, ALL EC STORES |
| PURCHASED PRODUCT CATEGORY | — |
| PURCHASED PRODUCT NAME | FN SAKE BREWERY SOUR CAN / FN DAIRY SS CHEESE / FN MILLED FN 100% PASTA 10 mm |
| TOTAL PURCHASE AMOUNT | 200 YEN OR MORE |
| NUMBER OF COMBINATIONS OF PURCHASED PRODUCT CATEGORY | PURCHASING TWO OR MORE OF ABOVE PRODUCTS |
| NUMBER OF TIMES | THREE TIMES PER PERSON |
| DETERMINATION OF INITIAL PURCHASE | NO LIMITATION |
| PAYMENT METHOD (CASH/CREDIT CARD/ELECTRONIC MONEY) | NO LIMITATION |
| PAYMENT MEDIUM TYPE (CARD/MOBILE) | NO LIMITATION |
| MEMBERSHIP RANK | NO LIMITATION |

```
       FN SUPERMARKET STORE
       IN FRONT OF BB STATION
         TEL000-000-000

RECEIPT

MAY 1, 2018

00091    TOMATO           ¥ 98
  00171    CARROT            ¥ 99
  02445    SALMON FILLET    ¥ 500
  08401    ONION             ¥ 78
  00051    FN SOUR          ¥ 498
  00300    BANANA           ¥ 138

TOTAL                    ¥ 1,411
  ( CONSUMPTION
    TAX INCLUDED            ¥ 105)

TENDERED                 ¥ 2,000
  CHANGE                    ¥ 589
```

| SYSTEM ID |
| --- |
| CAMPAIGN ID |
| ELECTRONIC MONEY TYPE |
| INFLUX ROUTE |
| ELECTRONIC MONEY ISSUANCE CONDITION |
| ELECTRONIC MONEY USE CONDITION |
| INCENTIVE CONTENT |
| DISPLAY MESSAGE/TRANSITION DESTINATION |

INFORMATION PROCESSING DEVICE, INFORMATION PROCESSING TERMINAL, AND INFORMATION PROCESSING METHOD

CROSS REFERENCE TO PRIOR APPLICATION

This application is a National Stage Patent Application of PCT International Patent Application No. PCT/JP2019/019625 (filed on May 17, 2019) under 35 U.S.C. § 371, which claims priority to Japanese Patent Application No. 2018-105751 (filed on Jun. 1, 2018), which are all hereby incorporated by reference in their entirety.

FIELD

The present disclosure relates to an information processing device, an information processing terminal, and an information processing method.

BACKGROUND

Currently, various promotion measures (campaigns) have been carried out toward consumers such as sales promotion measures carried out by business operators that manufacture and sell products or the like to promote sales of the products and use promotion measures carried out by business operators providing services related to electronic money to promote the use of electronic money. Examples of the above-mentioned sales promotion measure include giving incentives such as providing discount coupons, which can be used for the next purpose of a product, to a consumer who is confirmed to have satisfied predetermined conditions such as purchasing a predetermined product on the basis of the purchase history of the user. In addition, as the use promotion measure, for example, the right to play a game for the consumer to acquire points that can be used like electronic money according to the amount of use of electronic money at a physical store is given as an incentive. Further, by playing the game, the consumer can acquire points corresponding to a predetermined amount of money according to the game result. By the promotion measures involving the granting of incentives as described above, the consumer is motivated by the acquisition of incentives and is guided to take actions such as purchasing products and use of electronic money, and product sales and use of electronic money will be further promoted.

In addition, by providing an incentive through a card or terminal associated with the consumer, the business operator side can collect a lot of attribute information (for example, sex, age, or the like) of the consumer who has purchased a product or used electronic money and behavior information (for example, purchase time, place of purchase, or the like) and can use the collected information utilized in marketing activities. For example, as an example of the method of giving an incentive to a consumer as described above, there are techniques disclosed in Patent Literatures 1 to 3 below.

In addition, as a sales promotion measure, the business operator has conventionally advertised consumers to sell new products by using various media such as newspapers and televisions, the Internet, and the like. In particular, in recent years, there has been a method of using a technique such as an affiliate to guide a browser of a third-party website to the advertisement website of the business operator through the website. As a technique using such a method, there is a technique disclosed in Patent Literature 4 below.

CITATION LIST

Patent Literature

Patent Literature 1: JP 2002-92740 A
Patent Literature 2: JP 2005-11116 A
Patent Literature 3: JP 2012-181652 A
Patent Literature 4: JP 2008-225968 A

SUMMARY

Technical Problem

However, the above promotion measures have not been compatible with various purchasing channels used by consumers (for example, electronic commerce). In addition, since the above-mentioned advertisement by the business operator only provides information about the product or the like (including information such as campaign) in one direction from the business operator side, there is a limitation on a motivation to lead the consumer to take action such as purchasing the product. Therefore, it cannot be said that the promotion measures so far have effectively guided the consumer to the product purchase behavior or the electronic money use behavior.

Therefore, in view of the above circumstances, the present disclosure proposes a new and improved information processing device, information processing terminal, and information processing method capable of effectively implementing promotion measures.

Solution to Problem

According to the present disclosure, an information processing device is provided that includes: an information acquisition unit that acquires a transaction history between one or a plurality of electronic commerce business operators and a user; a determination unit that determines whether the user satisfies a predetermined condition on the basis of the acquired transaction history; and an incentive giving unit that gives the user a right to execute a game in which points can be given according to a result via an information processing terminal used by the user on the basis of a determination result.

Moreover, according to the present disclosure, an information processing terminal is provided that receives a right to execute a game in which points can be given according to a result when it is determined that a user satisfies a predetermined condition on the basis of a transaction history between one or a plurality of electronic commerce business operators and the user.

Furthermore, according to the present disclosure, an information processing method is provided that includes: acquiring a transaction history between one or a plurality of electronic commerce business operators and a user; determining whether the user satisfies a predetermined condition on the basis of the acquired transaction history; and giving the user a right to execute a game in which points can be given according to a result via an information processing terminal used by the user on the basis of a determination result.

Advantageous Effects of Invention

As described above, according to the present disclosure, promotion measures can be effectively implemented.

Note that the above-described effect is not necessarily restrictive, and any one of effects described in the present specification or any another effect obtainable from the present specification may be exhibited in addition to or in place of the above-described effect.

BRIEF DESCRIPTION OF DRAWINGS

FIG. 4 is an explanatory diagram for explaining an example of a purchase history DB 232 according to the first embodiment of the present disclosure.

FIG. 5 is an explanatory diagram for explaining an example of an acquisition condition DB 234 according to the first embodiment of the present disclosure.

FIG. 13 is an explanatory diagram for explaining an example of a receipt 600 used in the second embodiment of the present disclosure.

FIG. 18 is an explanatory diagram for explaining an example of a campaign DB 238 according to the third embodiment of the present disclosure.

DESCRIPTION OF EMBODIMENTS

Figure 1:
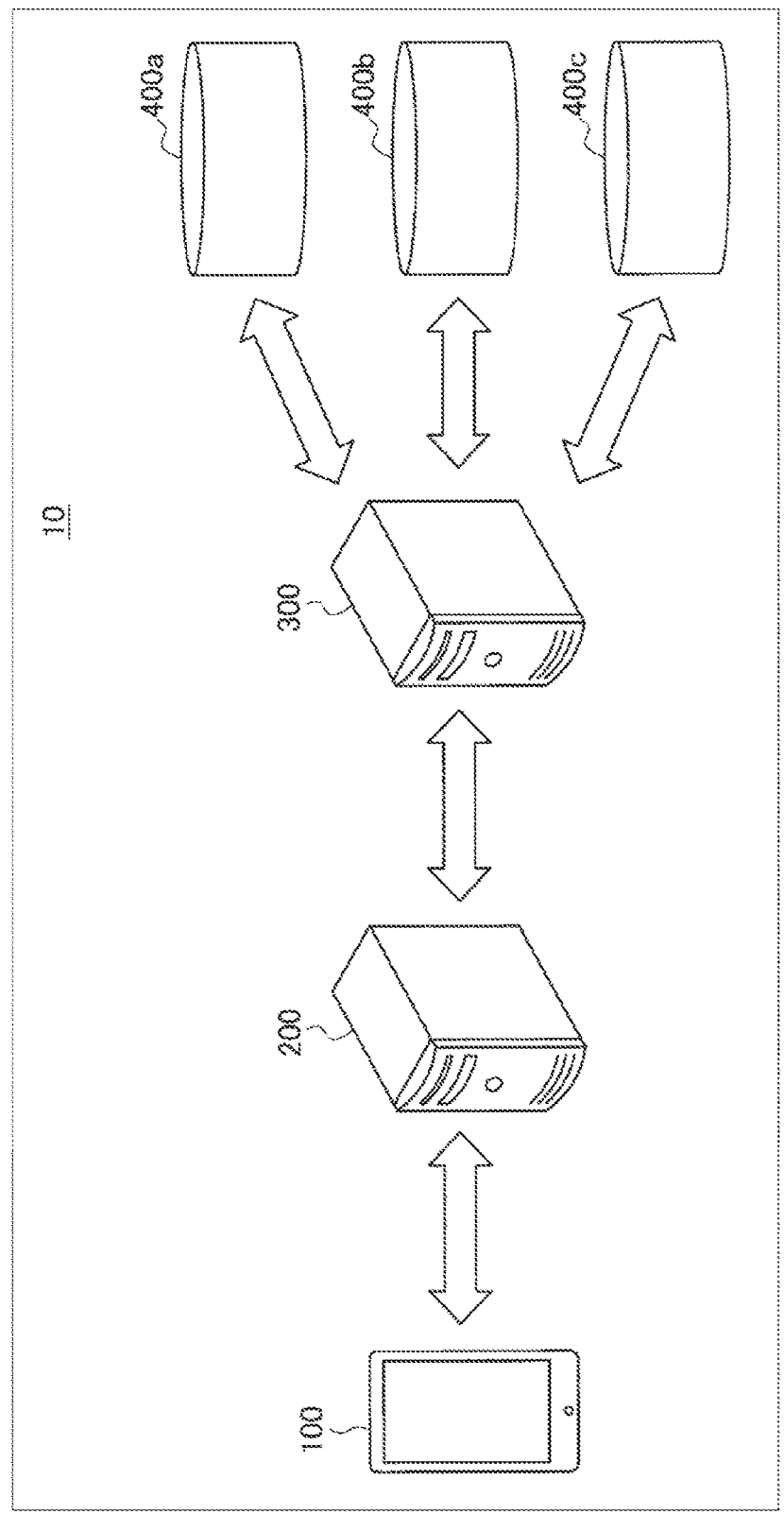
FIG. 1 is a system diagram illustrating a schematic configuration of an information processing system 10 according to a first embodiment of the present disclosure.

Hereinafter, preferred embodiments of the present disclosure will be described in detail with reference to the accompanying drawings. Note that, in this specification and the drawings, components having substantially the same functional configuration are denoted by the same reference numerals, and redundant description is omitted.

In addition, in this specification and the drawings, a plurality of components having substantially the same or similar functional configuration may be distinguished by giving the same reference numerals followed by different alphabets in some cases. However, when it is unnecessary to particularly distinguish each of the plurality of components having substantially the same or similar functional configuration, only the same reference numeral is assigned.

Note that the description will be given in the following order.

1. Background leading to creation of embodiments of the present disclosure
2. First Embodiment
  2.1 Schematic configuration of the information processing system 10
  2.2 Detailed configuration of the user terminal 100
  2.3 Detailed configuration of the service server 200
  2.4 Detailed configuration of the aggregation server 300
  2.5 Variation of the aggregation server 300a
  2.6 Information processing method
3. Second Embodiment
4. Third Embodiment
  4.1 Schematic configuration of the information processing system 10a
  4.2 Detailed configuration of the code management server 500
  4.3 Detailed configuration of the service server 200a
  4.4 Information processing method
    4.4.1 Referral code issuance stage
    4.4.2 Incentive giving stage by referral code
    4.4.3 Incentive giving stage by Internet advertisement
5. Conclusion
6. Hardware configuration
7. Supplement 1. Background Leading to Creation of Embodiments of the Present Disclosure First, before describing details of embodiments according to the present disclosure, description will be given of a background to creation of the embodiments according to the present disclosure by the present inventors.

The present inventors have repeatedly studied the promotion measures and the like as described above. Examples of the promotion measure include that the right to play a game for the consumer to acquire points that can be used like electronic money is given as an incentive according to the amount of use of electronic money at a physical store. Alternatively, examples of the above promotion measure include giving the points as an incentive to the consumer according to the purchase amount of the product designated at a physical store. Further, although it is different from the direct promotion measure, there are cases where the consumer can acquire the above points as an incentive by answering a questionnaire regarding the use of electronic money or the like. By the promotion measures involving the granting of incentives as described above, the consumer is motivated by the acquisition of incentives and is guided to take actions such as use of electronic money and product purchase, and the product purchase and use of electronic money will be further promoted. In addition, by providing incentives via a card, terminal, or app that is associated with the consumer, the business operator side can associate the attribute information or action information of the consumer that has been previously collected as member information of the member who uses electronic money with information of purchased products or the like, and more information can be collected. Then, the business operator can utilize the information collected in this way for future marketing activities.

However, in recent years, many consumers are more likely to purchase products from an electronic commerce (EC) business operator (electronic commerce business operator) because of its convenience rather than at a physical store. Therefore, in such a situation, consumers have been strongly demanding promotion measures that enable them to obtain the above-mentioned opportunity to acquire incentives when they purchase products from EC business operators.

In addition, since the promotion measures so far, which have not been compatible with electronic commerce, could not been able to collect information related to electronic commerce, the collected information cannot be said to be information about sufficient consumer consumption activities, causing a limitation on marketing activities.

Therefore, in view of the above-mentioned situation, the present inventors have earnestly studied to implement an effective promotion measure corresponding to electronic commerce. Then, the inventors have created embodiments of the present disclosure capable of implementing effective promotion measures as described below.

In the embodiments of the present disclosure described below, consumers can acquire incentives such as points that can be used like electronic money through product purchase not only at a physical store, but also through electronic commerce. Therefore, according to the present embodiments, it is possible to increase the opportunities for consumers to acquire incentives at each stage, which can effectively lead to the promotion of purchase of products or the like. Additionally, according to the present embodiments, since it is possible to collect information related to electronic commerce, it is possible to collect information related to consumption activities of more consumers, and utilize the collected information for future marketing activities. The details of the embodiments of the present disclosure created by the present inventors will be sequentially described below.

Note that, in the following description, unless otherwise specified, a user means a general consumer, and unless otherwise specified, an EC business operator means a business operator that conducts electronic commerce with respect to a general consumer. In addition, unless otherwise specified, the business operator means a business operator that manufactures or sales a product or the like to general consumers by using websites operated by an EC business operator, a business operator that provides services related to electronic money, a business operator that plans and manages promotion measures (campaigns), and the like.

Further, in the following description, unless otherwise specified, a referrer means a user who provides referral of predetermined electronic money to an acquaintance or the like, and unless otherwise specified, a referree means a user who receives referral of the use of electronic money from the above referrer.

2. First Embodiment

<2.1 Schematic Configuration of the Information Processing System 10>

First, a schematic configuration of an information processing system 10 according to the first embodiment of the present disclosure will be described with reference to FIG. 1. FIG. 1 is a system diagram illustrating a schematic configuration of the information processing system 10 according to the present embodiment.

As illustrated in FIG. 1, the information processing system 10 according to the present embodiment can include, for example, a user terminal (information processing terminal) 100, a service server (information processing device) 200, and an aggregation server (information aggregation apparatus) 300. The user terminal 100, the service server 200, and the aggregation server 300 described above can communicate with each other via various wired or wireless communication networks (illustration omitted). Note that the number of user terminals 100, service servers 200, and aggregation servers 300 included in the information processing system 10 is not limited to the numbers illustrated in FIG. 1, but may be more. Hereinafter, the overview of each apparatus included in the information processing system 10 according to the present embodiment will be described.

(User Terminal 100)

The user terminal 100 is a user-owned information processing terminal used by the user. For example, the user terminal 100 can be a mobile phone such as a smartphone, a general-purpose personal computer (PC), a tablet terminal, a wearable device such as a head mounted display (HMD) or a smart watch, or the like.

The user terminal 100 can, for example, order an EC business operator for a product or service, that is, perform electronic commerce with the EC business operator. More specifically, the user terminal 100 can perform electronic commerce via an EC site provided by an EC business operator, sends an e-mail or the like to an EC business operator, or receives an e-mail from the EC business operator according to a user operation. For example, the EC site includes, as the product information of a sold product, information such as a product code, a product name, a category, an image picture, manufacturing, a distributor, and a selling price, and the uniform resource locator (URL) of the EC site. The user terminal 100 displays such an EC site to the user, and the user operates according to the display, thereby transmitting a sales log to an EC business operator server 400 managed by the EC business operator so as to perform electronic commerce. Further, the EC business operator server 400 that has received the sales log performs payment processing and delivery processing, and, for example, transmits a purchase confirmation e-mail including sales log information for confirming the purchase of the product with respect to the user, to the user terminal 100. Note that the sales log can include information such as the product code, name, sales date and time, sales price, purchaser, and sales site of the sale product, as well as information about the site browsing history by the purchaser.

In addition, the user terminal 100 is equipped with a browsing app that allows browsing of not only the EC site but also an advertising site of a campaign for sales promotion provided by a business operator. In addition, the user terminal 100 is equipped with an incentive app for receiving an incentive from the business operator on the basis of determination by the service server 200, which will be described later. For example, the incentive app can execute a game for acquiring points that can be used like electronic money on the basis of determination by the service server 200, which will be described later. Then, the incentive app can receive points corresponding to a predetermined amount of money according to the game result when the user executes the game.

Further, the user terminal 100 may be equipped with an electronic money app for allowing the user to make payment using electronic money via the user terminal 100. More specifically, the user terminal 100 is equipped with the above-mentioned app and is held over a reader/writer installed in a physical store so that identification information about the user and the like (for example, a member ID, a name, a member registration date, a member registration store) and information of held electronic money (for example, usage amount, available amount) can be provided to the reader/writer, and payment processing when purchasing a product can be performed. Then, the information about the payment processing is transmitted to a server (illustration omitted) managed by a business operator that provides a service related to electronic money, and the business operator can acquire information such as the use amount of electronic money used by the user, a usage location, and a purchased product.

In addition, the user terminal 100 can also capture an image of a receipt 600 (see FIG. 13) or the like, and can transmit the captured image data to another server (illustration omitted). Further, the user terminal 100 can also transmit and receive information to and from another server such as the service server 200 described later.

Note that the above functions are mere examples, and the user terminal 100 may appropriately have functions other than the above. Further, the user terminal 100 may have a plurality of functions by itself. In addition, the detailed configuration of the user terminal 100 will be described later.

(Service Server 200)

The service server 200 is, for example, a computer managed by a business operator and capable of communicating with the user terminal 100 operated by the user. For example, the service server 200 can determine whether electronic commerce performed by the user satisfies conditions (predetermined conditions) to which an incentive is given, and can give the user an incentive on the basis of the determination result. In addition, the service server 200 can transmit and receive information to and from the aggregation server 300 described later in order to acquire the purchase history (transaction history) used in making the above determination. Note that the above functions are mere examples, and the service server 200 may appropriately have functions other than the above. In addition, the detailed configuration of the service server 200 will be described later.

(Aggregation Server 300)

The aggregation server 300 is a computer for aggregating purchase histories (transaction histories) regarding the users from EC business operator servers (information management apparatuses) 400a, 400b, 400c managed by the EC business operator. The EC business operator server 400 stores information for conducting an electronic commerce procedure through the EC site, for example, a sales log transmitted from the user, information about payment status, delivery status of products, and the like. Therefore, the aggregation server 300 acquires the purchase histories of the user from the EC business operator server 400 and aggregates the purchase histories. Further, the service server 200 described above can acquire the purchase history of a predetermined user from the aggregation server 300. Note that the detailed configuration of the aggregation server 300 will be described later.

Note that it is preferable that the service server 200 and the aggregation server 300 described above transmit and receive the information of purchase history, in other words, cooperate with each other, via an application programming interface (API), that is, an interface common to both.

Note that, in the present embodiment, the service server 200 and the aggregation server 300 do not have to be realized by a single apparatus. For example, each of the service server 200 and the aggregation server 300 described above may be realized by a plurality of apparatuses that are connected via various wired or wireless communication networks (illustration omitted) and cooperate with each other.

<2.2 Detailed Configuration of the User Terminal 100>

Figure 2:
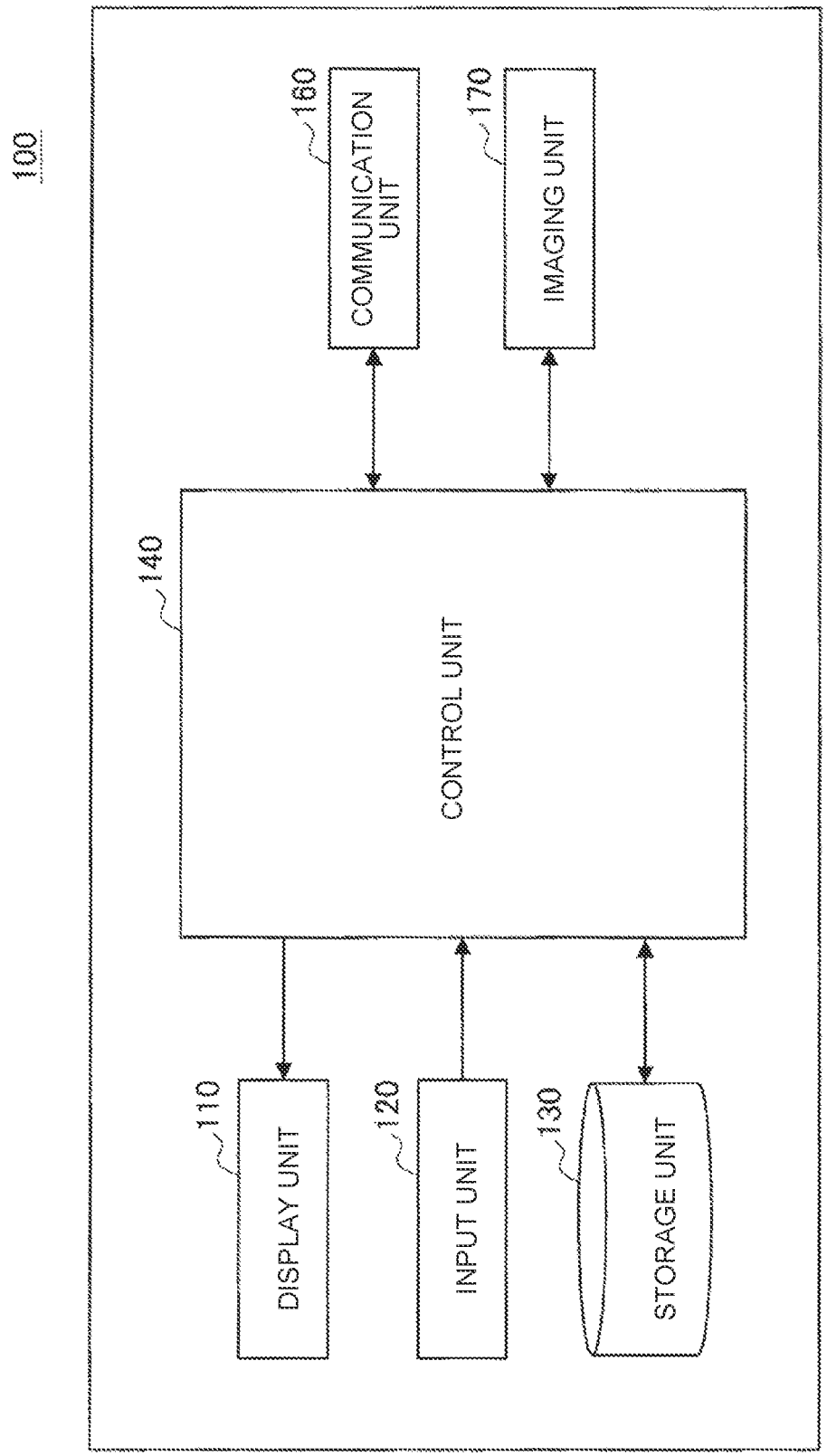
FIG. 2 is a diagram illustrating an example of functional blocks of a user terminal 100 according to the first embodiment of the present disclosure.

The overview of the information processing system 10 according to the present embodiment has been described above. Next, a detailed configuration of each apparatus included in the information processing system 10 according to the present embodiment will be sequentially described. First, a detailed configuration of the user terminal 100 will be described with reference to FIG. 2. FIG. 2 is a diagram illustrating an example of functional blocks of the user terminal 100 according to the present embodiment.

As illustrated in FIG. 2, the user terminal 100 according to the present embodiment mainly includes a display unit 110, an input unit 120, a storage unit 130, a control unit 140, a communication unit 160, and an imaging unit 170. The functional blocks of the user terminal 100 will be sequentially described below.

(Display Unit 110)

The display unit 110 is a display module including a display such as a liquid crystal display (LCD), an organic light-emitting diode (OLED), or a cathode ray tube (CRT). The display unit 110 is used, for example, to display an image of an EC site provided by an EC business operator or a campaign site for sales promotion. Note that the display unit 110 does not have to be configured as a part of the user terminal 100, but, for example, a display apparatus connected to the user terminal 100 by wire or wirelessly may be treated as the display unit 110.

(Input Unit 120)

The input unit 120 receives input of data and commands to the user terminal 100. More specifically, the input unit 120 is realized by a touch panel, a keyboard, or the like, and can receive an input of a command instruction from a user.

(Storage Unit 130)

The storage unit 130 is realized by a magnetic recording medium such as a hard disk (HD), a non-volatile memory, or the like provided in the user terminal 100, and stores various information. For example, the storage unit 130 can, for example, store image data of a receipt 600 (see FIG. 13) captured by the user. In addition, the storage unit 130 can store various apps that can be executed by the user terminal 100. Further, the storage unit 130 may store information of various types of information (member information, available amount of money, electronic payment information, etc.) used in a series of processing for payment using electronic money. Note that the various types of information described above are merely examples, and the storage unit 130 may store other types of information.

(Control Unit 140)

The control unit 140 is realized by hardware, for example, a central processing unit (CPU), a read only memory (ROM), a random access memory (RAM) provided in the user terminal 100, and can perform various processing executed by the user terminal 100.

(Communication Unit 160)

The communication unit 160 is realized by, for example, a communication device such as a communication antenna, a transmission/reception circuit, and a port, and can transmit and receive information to and from another server such as the service server 200. For example, the communication unit 160 can receive an e-mail from the service server 200. In addition, the communication unit 160 can transmit the image data to the service server 200. Additionally, the communication unit 160 may transmit various types of information used in a series of processing for payment to another server or the like via the reader/writer. Note that the various communication contents described above are merely examples, and the communication unit 160 may communicate other information.

(Imaging Unit 170)

The imaging unit 170 is a camera module that captures an image. The imaging unit 170 uses an image sensor such as a charge coupled device (CCD) and complementary metal oxide semiconductor (CMOS) to capture a subject (for example, the receipt 600), and generates image data.

Note that the various functional blocks illustrated in FIG. 2 are merely examples, and the user terminal 100 may have other functional blocks not illustrated in FIG. 2.

<2.3 Detailed Configuration of the Service Server 200>

Figure 3:
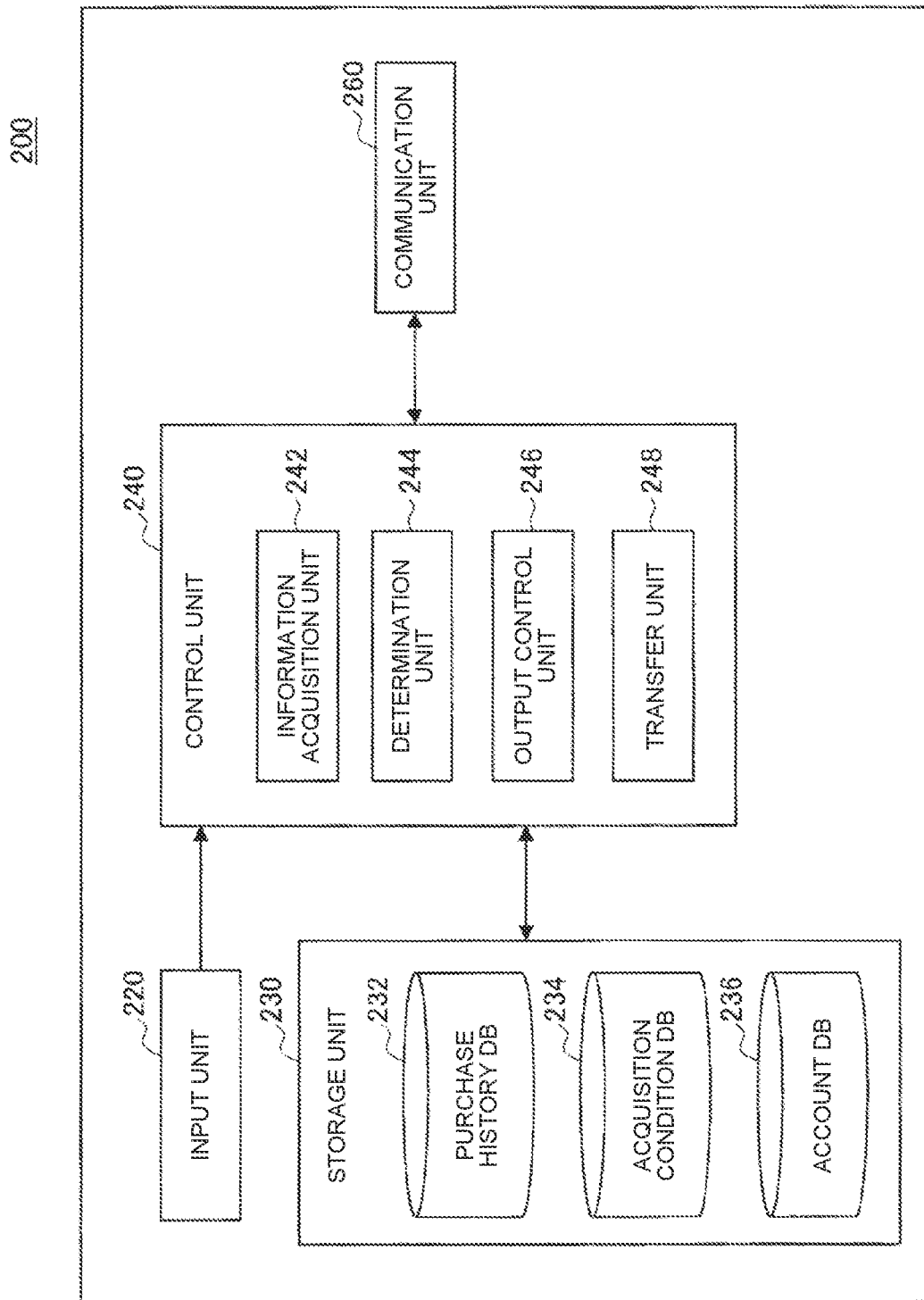
FIG. 3 is a diagram illustrating an example of functional blocks of a service server 200 according to the first embodiment of the present disclosure.

The detailed configuration of the user terminal 100 according to the present embodiment has been described above. Next, the detailed configuration of the service server 200 according to the present embodiment will be described with reference to FIGS. 3 to 5. FIG. 3 is a diagram illustrating an example of functional blocks of the service server 200 according to the present embodiment. FIG. 4 is an explanatory diagram for explaining an example of a purchase history DB 232 according to the present embodiment, and FIG. 5 is an explanatory diagram for explaining an example of an acquisition condition DB 234 according to the present embodiment.

As described above, the service server 200 according to the present embodiment determines whether electronic commerce or the like performed by the user satisfies the condition for giving an incentive, and can give the user an incentive on the basis of the determination result. Specifically, as illustrated in FIG. 3, the service server 200 can mainly include an input unit 220, a storage unit 230, a control unit 240, and a communication unit 260. The functional blocks of the service server 200 will be sequentially described below.

(Input Unit 220)

The input unit 220 receives input of data and commands to the service server 200. More specifically, the input unit 220 is realized by a touch panel, a keyboard, or the like, and can receive input of information about conditions for giving an incentive from a business operator.

(Storage Unit 230)

The storage unit 230 is realized by, for example, a magnetic recording medium such as a hard disk, a non-volatile memory, or the like provided in the service server 200, and stores a program for the control unit 240, which will be described later, to execute various processing, or the like, information for performing processing, received information, and the like. For example, the storage unit 230 can store information about the above conditions input by the business operator and the purchase history acquired from the aggregation server 300. Note that the various types of information described above are merely examples, and the storage unit 230 may store other types of information. Specifically, as illustrated in FIG. 3, the storage unit 230 stores a purchase history data base (DB) 232, an acquisition condition DB 234, and an account DB 236. Hereinafter, an example of information stored in the storage unit 230 will be described.

~Purchase History DB 232~

As illustrated in FIG. 4, the purchase history DB 232 stores various types of information such as a user's purchase history (purchase date and time (transaction date and time), purchase day of the week, purchase store (e.g., EC business operator, physical store, etc.), purchase product category, purchase product (transaction product), total purchase amount (transaction amount), the number of combinations of purchase product category, payment method (e.g., cash, credit card, electronic money), payment medium type (for example, credit card company, type of electronic money), user's membership rank, point service or electronic money member number, the number of times of purchase, a determination result as to whether the purchase is first purchase, associated with user identification information (user ID) (e.g., purchase confirmation e-mail address described later). Note that the various types of information described above are merely examples, and the purchase history DB 232 may store other types of information.

~Acquisition condition DB 234~

As illustrated in FIG. 5, the acquisition condition DB 234 stores information regarding conditions for giving an incentive to the user, which is input by a business operator. Specifically, as illustrated in FIG. 5, the acquisition condition DB 234 stores various types of information such as a purchase period for which an incentive is given to the user, a purchase day of the week, a purchase store (for example, an EC business operator, a physical store, etc.), a purchase product category, purchased product name, total purchase amount, the number of combinations of purchased product category (number of products), the number of times of purchase, and the determination result as to whether the purchase is the first purchase is set to conditions, and payment method (for example, cash, credit card, electronic money), payment medium type (for example, credit card company, type of electronic money), user membership rank, and the like.

For example, in the present embodiment, as illustrated in FIG. 5, different products sold by different business operators (e.g., FN brewing, FN dairy industry, FN milling) may be combined as a product for giving an incentive to the user. By doing so, according to the present embodiment, it is possible to easily implement a transverse sales promotion measure (campaign) for a plurality of business operators. Note that the various types of information described above are merely examples, and the acquisition condition DB 234 may store other types of information.

~Account DB 236~

The account DB 236 stores the user identification information used when the service server 200 acquires the purchase history from the aggregation server 300. For example, the account DB 236 stores a purchase confirmation e-mail address (details will be described later) as the identification information in association with the user e-mail address owned by the user. By using the information stored in the account DB 236 as described above, the service server 200 can transfer the e-mail related to the purchase confirmation e-mail address from the aggregation server 300 to the user (user terminal 100) by using the above user e-mail address. Note that the account DB 236 may not be provided depending on the method of aggregating purchase histories in the aggregation server 300.

(Control Unit 240)

The control unit 240 is realized by hardware such as a CPU, a ROM, and a RAM provided in the service server 200, and performs various processing executed by the service server 200. As illustrated in FIG. 3, the control unit 240 mainly includes an information acquisition unit 242, a determination unit 244, an output control unit (incentive giving unit) 246, and a transfer unit (transmission unit) 248. The processing blocks included in the control unit 240 will be described below.

~Information acquisition unit 242~

The information acquisition unit 242 can acquire the aggregated purchase history information of a predetermined user from the aggregation server 300 described later, using the above identification information. The purchase history is managed by the aggregation server 300 by aggregating the purchase history relating to transactions between a plurality of EC business operators and users for each user in association with the above identification information. Therefore, the information acquisition unit 242 can acquire the purchase history of a specific user by using the identification information. Note that the information acquisition unit 242 can acquire the purchase history from the aggregation server 300 in response to a request from the user terminal 100, and can output the acquired information to the determination unit 244 described later.

In addition, the information acquisition unit 242 can also acquire the image data of the receipt 600 (see FIG. 13) from the user terminal 100 described above. The information acquisition unit 242 can perform image processing and optical character recognition (OCR) on the acquired image data and extract the information displayed in the image data to acquire the information of the purchase history (for example, purchased product, purchase amount, purchase quantity, etc.) of the user at a physical store. Then, as described above, the information acquisition unit 242 can output the acquired information to the determination unit 244 described later. Note that the above processing contents are merely examples, and the information acquisition unit 242 may perform other processing.

~Determination unit 244~

On the basis of the acquired purchase history, the determination unit 244 can determine whether the user satisfies a preset condition for giving an incentive. Note that the above processing contents are merely examples, and the determination unit 244 may perform other processing.

~Output control unit 246~

The output control unit 246 can output the incentive-related information to the user terminal 100 via the communication unit 260 described below on the basis of the determination result of the determination unit 244 described above. For example, when the determination unit 244 determines that the user satisfies the above conditions, the output control unit 246 can transmit the information as to permission of execution of a game for acquiring points that can be used like electronic money, to the user terminal 100. More specifically, the game is a game in which the points can be given to the user according to the result of the game. That is, in the present embodiment, the user is given the right to execute the game as an incentive. Note that the above processing contents are merely examples, and the output control unit 246 may perform other processing.

~Transfer Unit 248~

The transfer unit 248 transfers the e-mail relating to the purchase confirmation e-mail address from the aggregation server 300 to the user (user terminal 100) using the user e-mail address associated with the purchase confirmation e-mail address. Note that the transfer unit 248 may not be provided depending on the method of aggregating purchase histories in the aggregation server 300.

(Communication Unit 260)

The communication unit 260 is realized by, for example, a communication device such as a transmission/reception circuit and a port, and can transmit and receive information to and from the user terminal 100, and another server such as the aggregation server 300. For example, the communication unit 260 can receive the purchase history of the user from the aggregation server 300. Note that the communication contents described above are merely examples, and the communication unit 260 may transmit and receive other information.

Note that the various functional blocks illustrated in FIG. 3 are merely examples, and the service server 200 may have other functional blocks not illustrated in FIG. 3.

<2.4 Detailed Configuration of the Aggregation Server 300>

Figure 6:
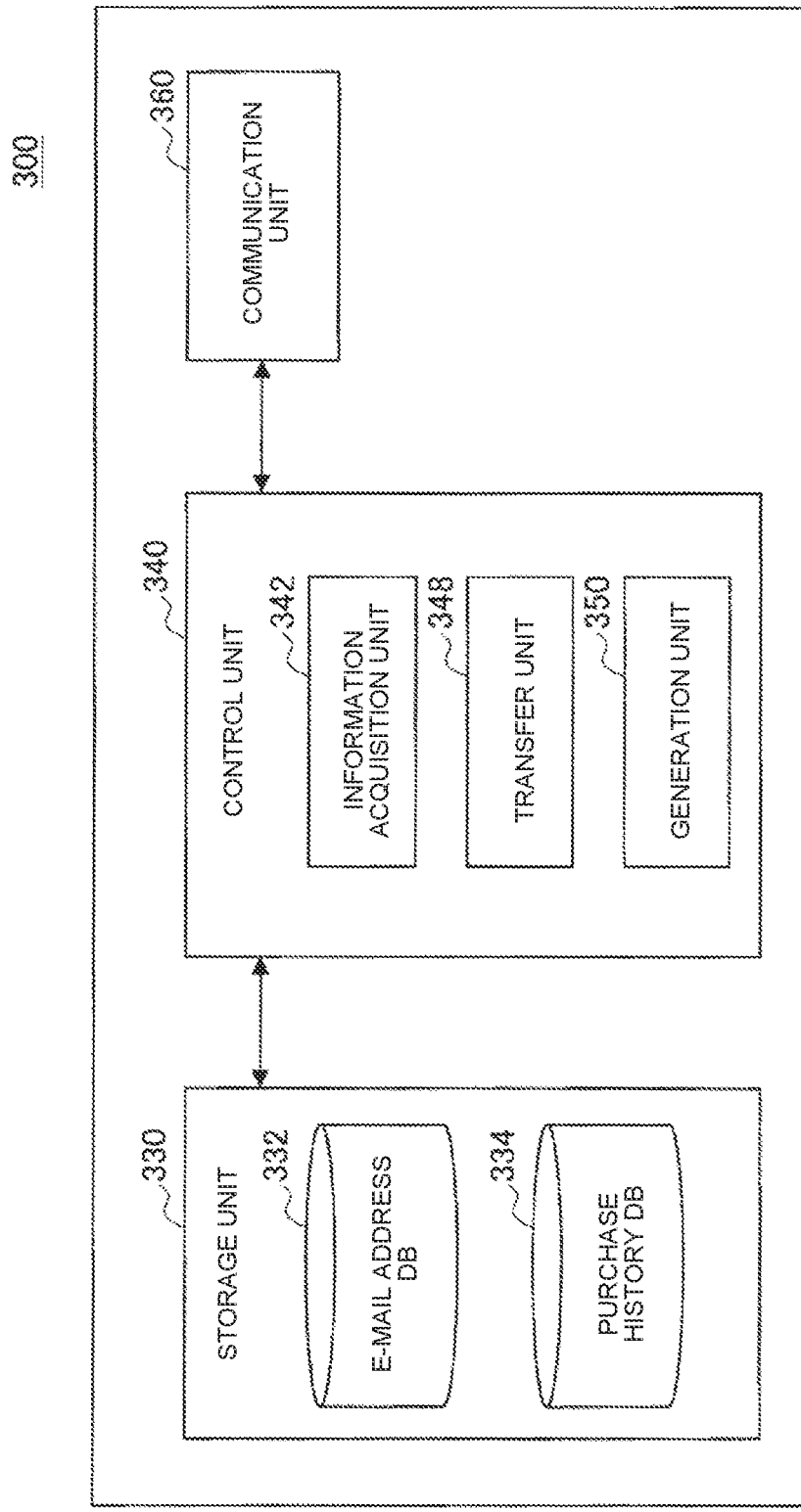
FIG. 6 is a diagram illustrating an example of functional blocks of an aggregation server 300 according to the first embodiment of the present disclosure.

The detailed configuration of the service server 200 according to the present embodiment has been described above. Next, a detailed configuration of the aggregation server 300 according to the present embodiment will be described with reference to FIG. 6. FIG. 6 is a diagram illustrating an example of functional blocks of the aggregation server 300 according to the present embodiment.

As described above, the aggregation server 300 according to the present embodiment can aggregate purchase histories regarding users from the EC business operator server 400 managed by the EC business operator. Specifically, as illustrated in FIG. 6, the aggregation server 300 can mainly include a storage unit (management unit) 330, a control unit 340, and a communication unit 360. The functional blocks of the aggregation server 300 will be sequentially described below.

(Storage Unit 330)

The storage unit 330 is realized by, for example, a magnetic recording medium such as a hard disk provided in the aggregation server 300, and stores a program for the control unit 340, which will be described later, to execute various processing, or the like, information obtained by the processing, received information, and the like. For example, as illustrated in FIG. 6, the storage unit 330 stores an e-mail address DB 332, a purchase history DB 334, and the like. Note that the above-mentioned stored information is merely an example, and the storage unit 330 may store other information.

~E-Mail Address DB 332~

The e-mail address DB 332 stores the purchase confirmation e-mail address generated by a generation unit 350 described later as user identification information. By using the information stored in the e-mail address DB 332, the aggregation server 300 can acquire the purchase history from a purchase confirmation e-mail for confirming the purchase of a product for the user received on behalf of the user from the EC business operator server 400. Since the aggregation server 300 can associate purchase confirmation e-mails from different EC business operators with the same user in the case of the same purchase confirmation e-mail address, the purchase histories relating to the user can be aggregated.

~Purchase History DB 334~

The purchase history DB 334 stores the purchase history of the user associated with the purchase confirmation e-mail address as identification information. Note that since the stored information is the same as that of the purchase history DB 232 described above, a detailed description thereof is omitted here.

(Control Unit 340)

The control unit 340 is realized by hardware such as a CPU, a ROM, and a RAM provided in the aggregation server 300, and performs various processing executed by the aggregation server 300. For example, the control unit 340 mainly includes an information acquisition unit (aggregation unit) 342, a transfer unit 348, and a generation unit 350, as illustrated in FIG. 6. The processing blocks included in the control unit 340 will be described below.

~Information Acquisition Unit 342~

As described above, the information acquisition unit 342 acquires the purchase history from the purchase confirmation e-mail received from the EC business operator server 400 on behalf of the user for confirming the purchase of the product for the user. The information acquisition unit 342 can associate the information of the purchase history with the same user and aggregate the information even in the case of purchase confirmation e-mails from different EC business operators as long as the purchase confirmation e-mail addresses are the same.

~Transfer Unit 348~

The transfer unit 348 transfers an e-mail related to the purchase confirmation e-mail address from the aggregation server 300 to the service server 200 described above.

~Generation Unit 350~

The generation unit 350 can generate the purchase confirmation e-mail address described above. Specifically, the generation unit 350 generates a purchase confirmation e-mail address in response to a request from the user terminal 100 via the service server 200, and notifies the user terminal 100 of the generated purchase confirmation e-mail address via the service server 200. At this time, the service server 200 stores the purchase confirmation e-mail address in association with the user e-mail address notified by the user. The user who has been notified of the purchase confirmation e-mail address registers the purchase confirmation e-mail address with an EC business operator as an e-mail address used when performing electronic commerce with the EC business operator. By doing so, the purchase confirmation e-mail from the EC business operator is received by the aggregation server 300, and the aggregation server 300 can acquire the purchase history from the received e-mail. In addition, in the present embodiment, a login ID and a password for directly logging in to the system for managing the purchase confirmation e-mail may be directly received from the user. In this case, the aggregation server 300 can acquire the corresponding e-mail from the mailbox storing the purchase confirmation e-mail using the received login ID and the like. Further, in the present embodiment, even when the aggregation server 300 receives and acquires the purchase confirmation e-mail from the EC business operator on behalf of the user, the purchase confirmation e-mail may be transferred to the user e-mail address owned by the user via the aggregation server 300 and the service server 200.

(Communication Unit 360)

The communication unit 360 is realized by, for example, a communication device such as a transmission/reception circuit and a port, and can communicate with an external apparatus such as the user terminal 100, the service server 200, or the like. For example, the communication unit 360 can transmit the purchase history of the user to the service server 200 in association with the purchase confirmation e-mail address in response to a request from the service server 200. Note that the communication contents described above are merely examples, and the communication unit 360 may transmit and receive other information.

<2.5 Variation of the Aggregation Server 300a>

Figure 7:
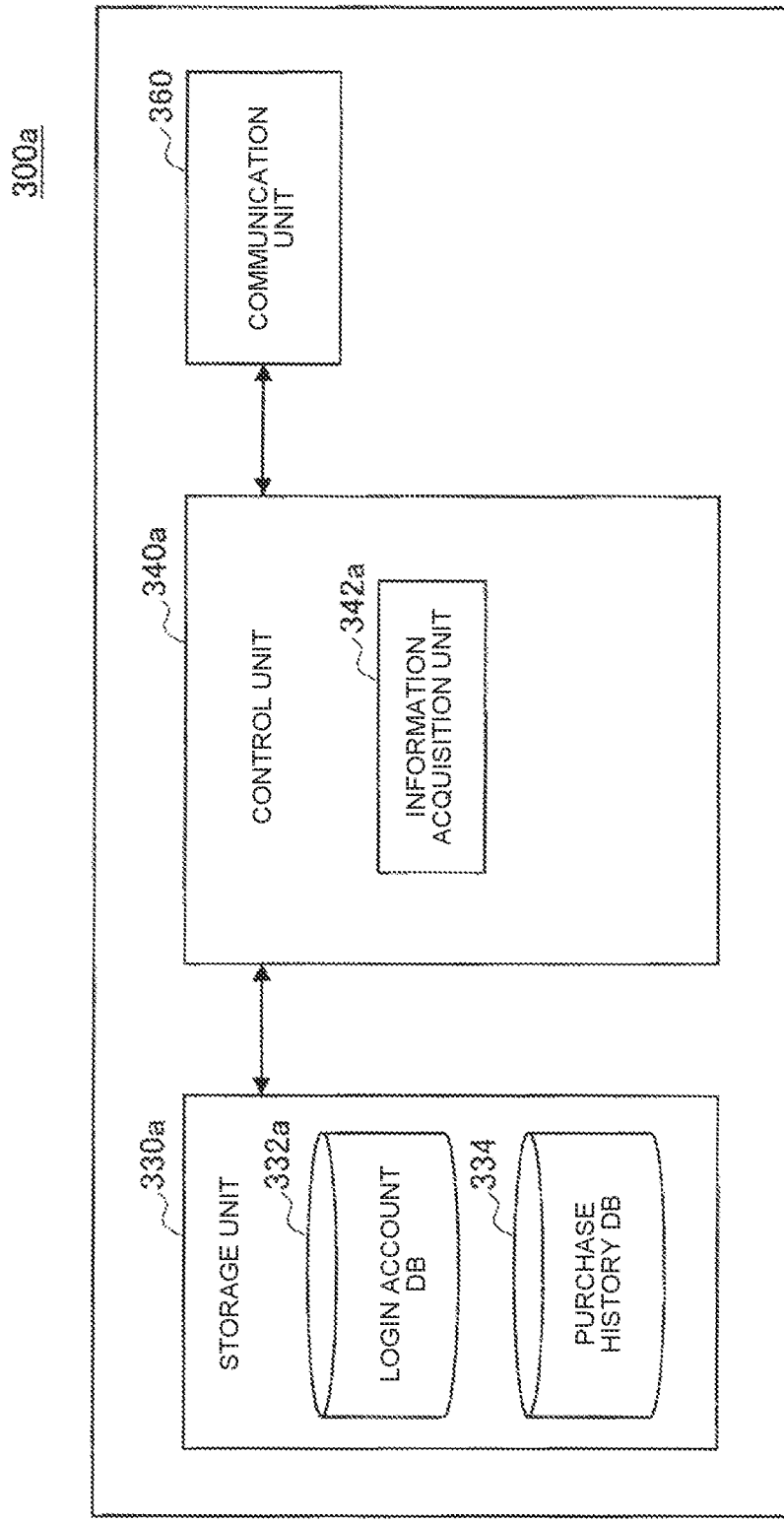
FIG. 7 is a diagram illustrating an example of functional blocks of an aggregation server 300a according to a variation of the first embodiment of the present disclosure.

In addition, the aggregation server 300 can be modified as described below. A detailed configuration of the aggregation server 300a according to a variation of the present embodiment will be described with reference to FIG. 7. FIG. 7 is a diagram illustrating an example of functional blocks of the aggregation server 300a according to the variation of the present embodiment. As illustrated in FIG. 7, the aggregation server 300a according to the present variation can mainly include a storage unit 330a, a control unit 340a, and a communication unit 360, as in the aggregation server 300 described above. In the present variation, the storage unit 330a has a login account DB 332a instead of the e-mail address DB 332, and the control unit 340a has an information acquisition unit 342a in which the method of acquiring the purchase history is different from the above method. Here, a detailed description will be omitted for the points common to the above-described aggregation server 300, and only different points will be described.

(Storage Unit 330a)

The storage unit 330a stores a program or the like that is provided in the aggregation server 300a and that is for the control unit 340a, which will be described later, to execute various processing. For example, as illustrated in FIG. 7, the storage unit 330a stores the login account DB 332a and the purchase history DB 334 described above.

~Login Account DB 332a~

The login account DB 332a stores the user's login account for logging in to the EC business operator server 400 managed by each EC business operator (note that login account is provided by the user in advance) in association with the identification information (unique ID) of the user. In the present variation, the purchase history DB 334 stores the purchase history acquired from the EC business operator server 400 in association with the identification information. Therefore, according to the present variation, even purchase histories from different EC business operators can be associated with one identification information assigned to each user, and thus the purchase histories of the users are aggregated. Further, the service server 200 can acquire the purchase history from the aggregation server 300 by using the identification information, and the acquired purchase history is stored in association with the identification information.

That is, in the present embodiment, the login account is managed by the aggregation server 300, not by the service server 200. Further, even when one user has a plurality of login accounts related to a plurality of EC business operators, the aggregation server 300 can aggregate the purchase history of the user by associating the plurality of login accounts with the identification information of the user.

(Control Unit 340a)

The control unit 340a is realized by hardware such as a CPU, a ROM, and a RAM provided in the aggregation server 300a, and performs various processing executed by the aggregation server 300a. For example, the control unit 340a mainly includes an information acquisition unit 342a, as illustrated in FIG. 7.

~Information Acquisition Unit 342a~

The information acquisition unit 342a acquires the purchase history from the EC business operator server 400 using the login account associated with the identification information. For example, the aggregation server 300 is configured to perform scraping for extracting the purchase history from a page related to a user of an EC site (HTML content) provided by the EC business operator server 400. Alternatively, the aggregation server 300 and the EC business operator server 400 may be configured to transmit and receive the purchase history information via an API, that is, an interface common to both.

<2.6 Information Processing Method>

Figure 8:
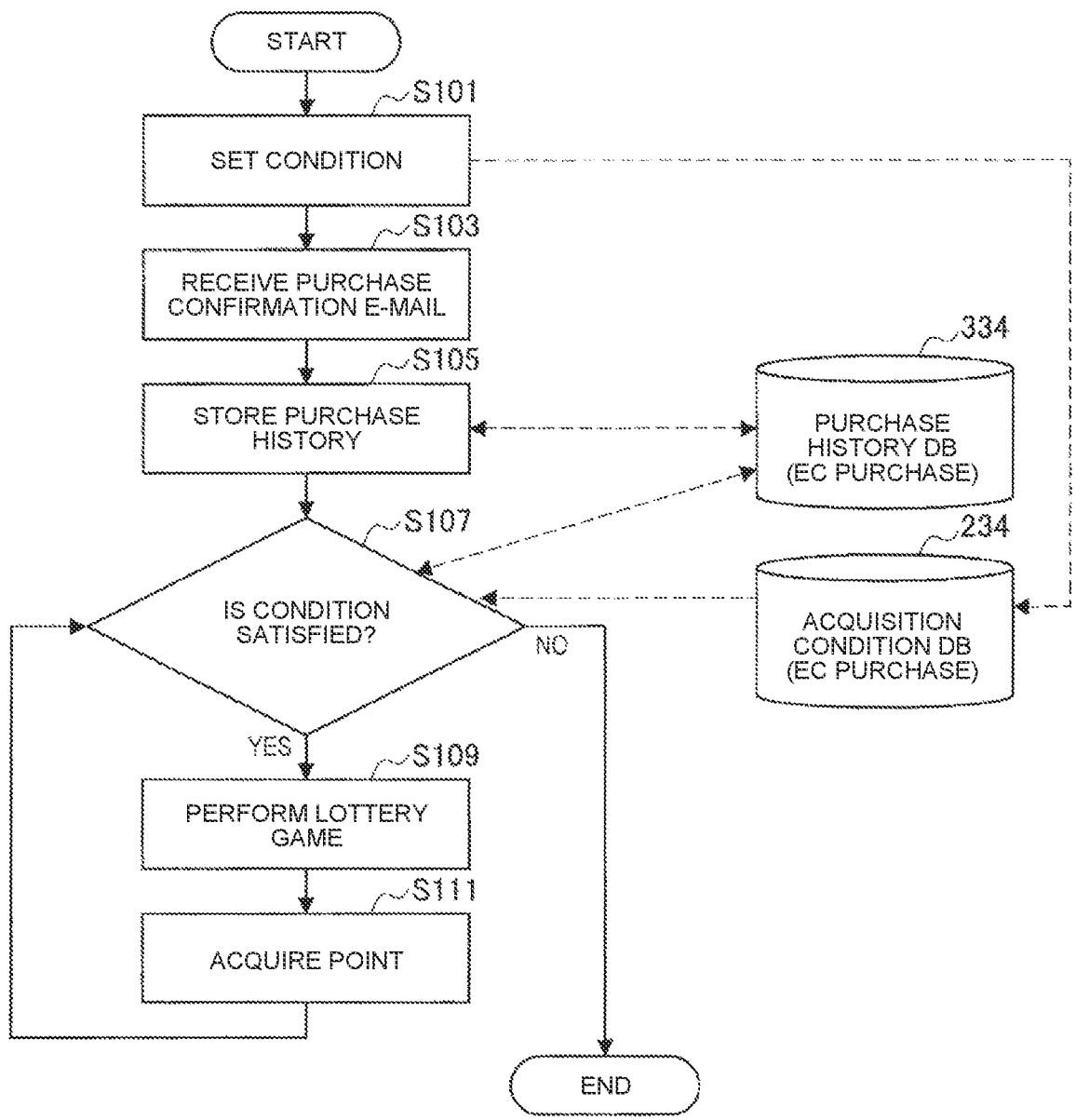
FIG. 8 is a flowchart illustrating an example of an information processing method according to the first embodiment of the present disclosure.
Figure 9:
FIG. 9 is an explanatory diagram for explaining an example of a display screen 602 of a lottery game according to the first embodiment of the present disclosure.
Figure 10:
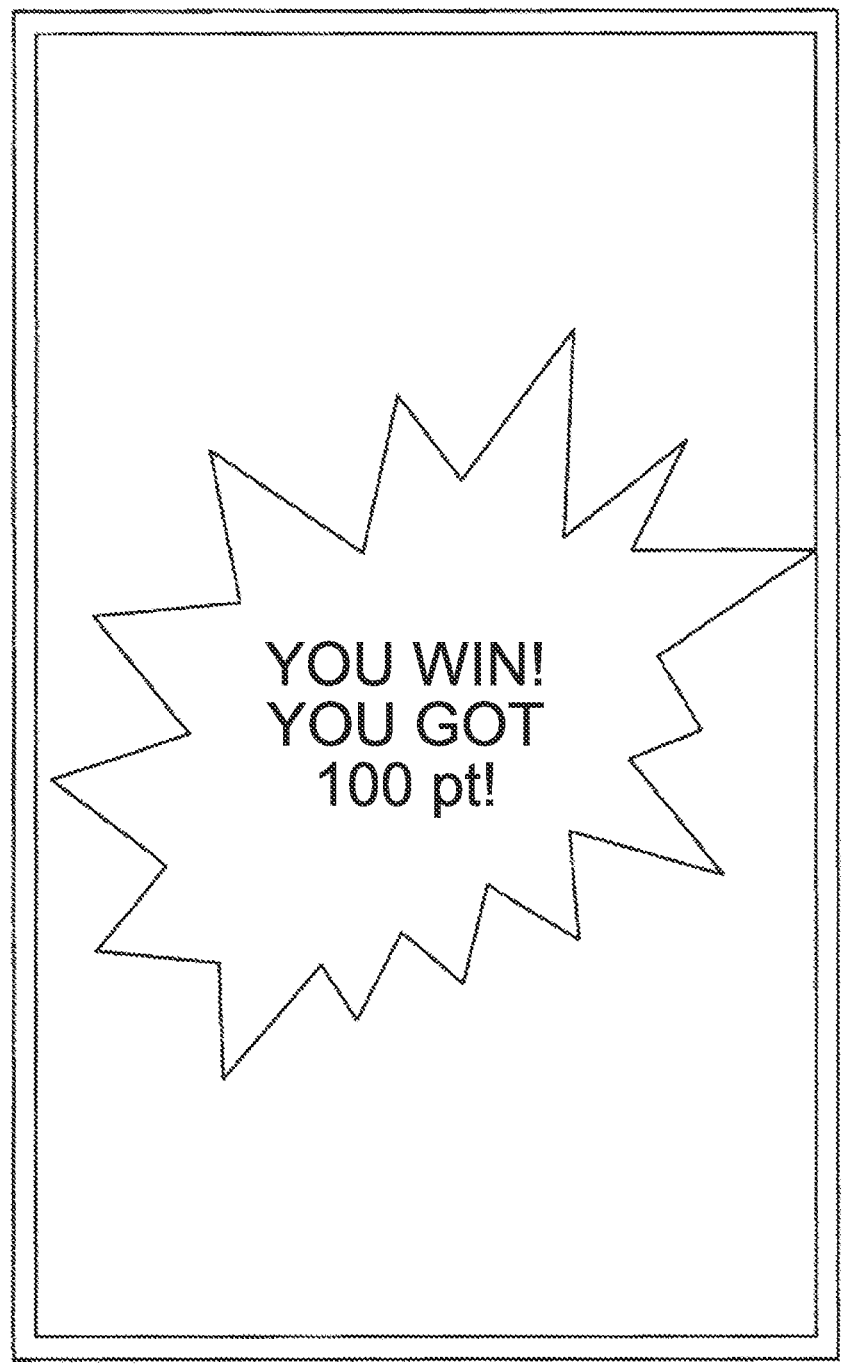
FIG. 10 is an explanatory diagram for explaining an example of a display screen 604 of a lottery game according to the first embodiment of the present disclosure.
Figure 11:
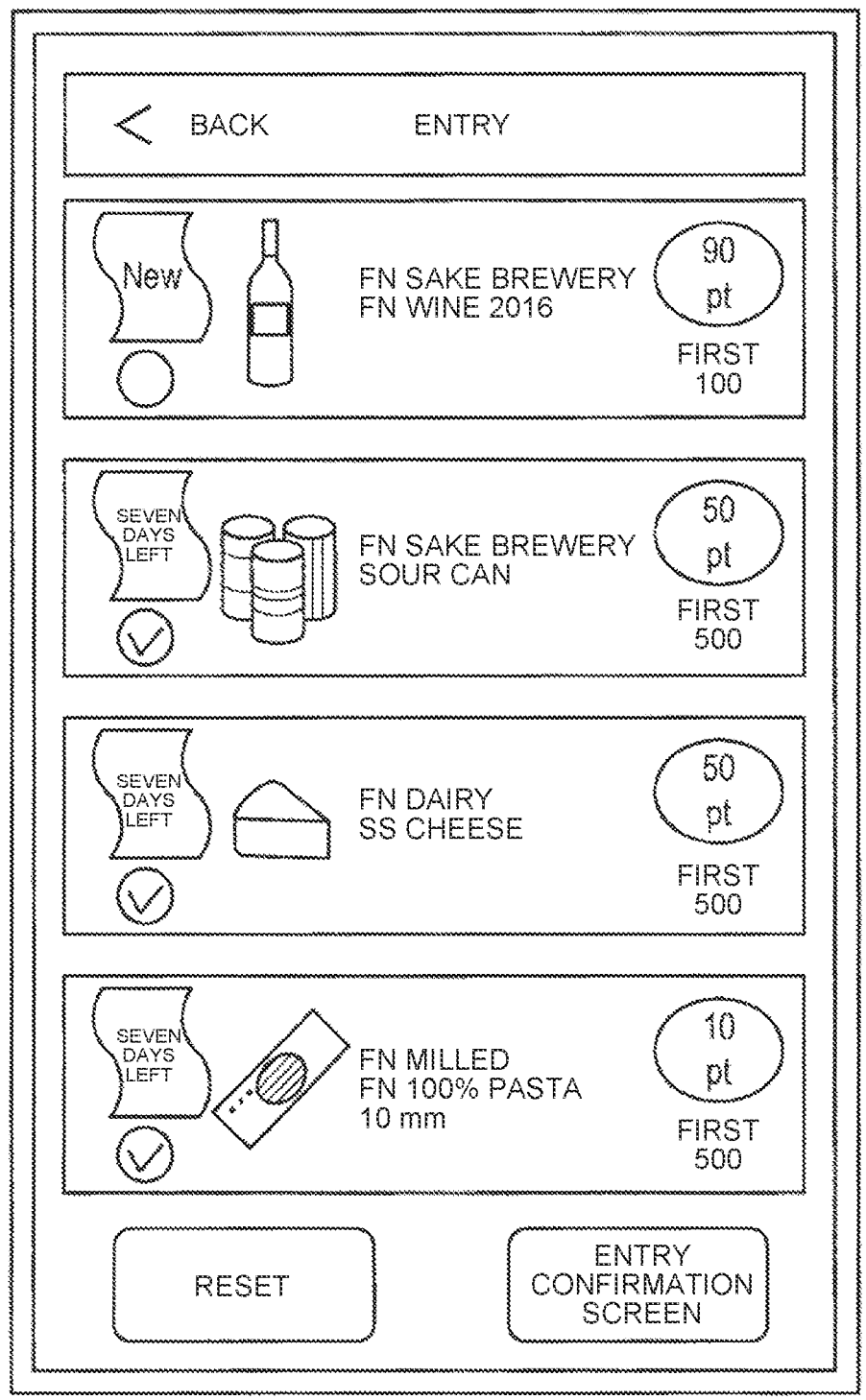
FIG. 11 is an explanatory diagram for explaining an example of a display screen 606 of entry according to the first embodiment of the present disclosure.

The detailed configuration of each apparatus included in the information processing system 10 according to the present embodiment has been described above. Next, regarding the information processing method according to the present embodiment, the information processing method according to the present embodiment will be described with reference to FIGS. 8 to 11. FIG. 8 is a flowchart illustrating an example of the information processing method according to the present embodiment. In addition, FIGS. 9 and 10 are explanatory diagrams for explaining an example of display screens 602 and 604 of a lottery game according to the present embodiment. Further, FIG. 11 is an explanatory diagram for explaining an example of a display screen 606 of entry according to the present embodiment.

Specifically, as illustrated in FIG. 8, the information processing method according to the present embodiment can include a plurality of steps from Step S101 to Step S111. Details of each of these steps will be described below.

(Step S101)

A business operator inputs conditions for giving the user an incentive to the service server 200 and sets the conditions. Information about the setting conditions is stored in the acquisition condition DB 234 described above.

For example, as illustrated in FIG. 5, the acquisition condition DB 234 stores various types of information such as a purchase period for which an incentive is given to the user, a purchase day of the week, a purchase store (for example, an EC business operator, a physical store, etc.), a purchase product category, purchased product name, total purchase amount, the number of combinations of purchased product category, the number of times of purchase, and the determination result as to whether the purchase is the first purchase is set to conditions, and payment method (for example, cash, credit card, electronic money), payment medium type (for example, credit card company, type of electronic money), user membership rank, and the like. Specifically, the example illustrated in FIG. 5 shows the condition of giving an incentive when any two products of "FN Sake Brewery Sour Can", "FN Dairy SS cheese", and "FN milled FN 100% pasta 10 mm" are purchased for 200 yen or more each between Feb. 1 and Apr. 30, 2018 between a physical store and an EC business operator. In addition, the maximum number of times an incentive can be given is set to three. Note that, in the present embodiment, the setting conditions are not limited to the conditions illustrated in FIG. 5, and various settings are possible.

In the present embodiment, a target store is not limited to a physical store, but may be an EC business operator. Further, the EC business operator is not limited to one EC business operator, but can be set across a plurality of EC business operators. Further, in the present embodiment, a target product is also not limited to the product sold by the same business operator (seller, manufacturer), but products sold by different business operators can be combined. For example, the conditions illustrated in FIG. 5 are intended such that different business operators from "FN Brewing", "FN Dairy", and "FN Milling" transversely tie up and propose consumers the opportunity to enjoy pasta, cheese and sake at the same time to perform sales promotion transversely. In addition, in the present embodiment, a target payment method can also be set across a plurality of electronic money. As described above, in the present embodiment, the target EC business operator, sales business operator, payment method, type of electronic money, product, etc. can be set transversely, and the target period, target amount, payment method, etc. can be finely and flexibly set in advance, and thus more effective promotion measures are possible.

(Step S103)

The aggregation server 300 receives a purchase confirmation e-mail from the EC business operator server 400 for confirming that the user has purchased a product from the EC business operator. As described above, the aggregation server 300 preliminarily generates a purchase confirmation e-mail address in response to a request from the user terminal 100 via the service server 200, and notifies the user terminal 100 of the generated purchase confirmation e-mail address via the service server 200. Then, the user who has been notified of the purchase confirmation e-mail address registers the purchase confirmation e-mail address with an EC business operator as an e-mail address used when performing electronic commerce with the EC business operator. By doing so, the purchase confirmation e-mail from the EC business operator is received by the aggregation server 300. At this time, the aggregation server 300 transfers the purchase confirmation e-mail to the user e-mail address owned by the user via the service server 200.

(Step S105)

The aggregation server 300 acquires the purchase history of the user from the received purchase confirmation e-mail and stores it in the purchase history DB 334. At that time, the aggregation server 300 stores the purchase history in association with the purchase confirmation e-mail address. For example, the purchase history includes information such as the date and time of the transaction made by the user with the EC business operator, the product, and the amount of money, and more specifically, various types of information illustrated in FIG. 4.

(Step S107)

The service server 200 acquires the purchase history of the user in question from the purchase history DB 334 of the aggregation server 300 in response to a request from the user terminal 100 (a request is transmitted from the user terminal 100 to the service server 200 by the user operating a predetermined app on the user terminal 100).

Then, the service server 200 compares the information regarding the conditions stored in the acquisition condition DB 234 with the acquired purchase history, and determines whether the user satisfies the condition for giving an incentive. When the service server 200 determines that the condition is not satisfied, the processing ends, and when the condition is satisfied, the processing proceeds to Step S109.

Note that, at this time, since there is a double taking of incentives by a malicious user, the service server 200 determines whether there is no double taking. For example, even if it is not possible to install multiple apps related to the same service on a single terminal, one user can have multiple terminals, so that the same person can acquire multiple incentives. Therefore, the service server 200 uses various kinds of identification information or the like to determine whether the same person does double taking of incentives.

(Step S109)

The service server 200 transmits, to the user terminal 100, information indicating that execution of a game for acquiring points that can be used like electronic money is permitted. The user terminal 100 that has received the information displays, for example, a display screen 602 related to the lottery game as illustrated in FIG. 9. Then, the user can play the lottery game permitted as described above via the user terminal 100. Note that the display screen 602 illustrated in FIG. 9 is an example of the display screen related to the lottery game, and is not limited to such a form.

(Step S111)

The user acquires points on the basis of the result of the lottery game performed in Step S109 described above. The user terminal 100 gives points to the user by displaying the display screen 604 related to the lottery game as illustrated, for example, in FIG. 10. Note that the information of the acquired point is transmitted by the user terminal 100 to a server (illustration omitted) of the business operator that provides the service related to electronic money, and the processing of giving the points to the user is performed. In addition, the display screen 604 illustrated in FIG. 10 is an example of the display screen related to the lottery game, and is not limited to such a form. Then, the service server 200 returns to Step 3107.

Note that, in the present embodiment, the granting of an incentive is not limited to the execution of a lottery game, but, for example, points may be given without the execution of such a game, and a discount coupon may be provided.

Note that, in the above description, the user operates a predetermined app on the user terminal 100, the user terminal 100 transmits a request to the service server 200, and the service server 200 automatically determines whether the condition is met. However, the present embodiment is not limited to such a method, and a list of products purchased by the user may be checked to determine whether to apply (entry) for a campaign (promotion measure), and the user may be allowed to perform an application operation according to the determination.

For example, in the present embodiment, as illustrated in FIG. 11, a display screen 606 of entry, which is a list of products purchased by the user, may be displayed on the user terminal 100. In addition, when there are a plurality of campaigns, a list of only products that are the targets of the campaigns and that the user purchased may be displayed on the display screen 606. Then, the user can select a campaign to apply by selecting a product or the like through such a display screen 606.

In addition, in the above-described information processing method, the purchase confirmation e-mail address is used to aggregate the purchase histories of a predetermined user, but the present embodiment is not limited to this, and the purchase history of the user may be aggregated by using the login account associated with the user identification information (unique ID), owned by the user and used for logging in to the EC business operator server 400 managed by each EC business operator.

As described above, according to the present embodiment, consumers can acquire incentives when purchasing products in electronic commerce. Therefore, according to the present embodiments, it is possible to increase the opportunities for consumers to acquire the points at each stage, which can effectively lead to the promotion of purchase of products or the like. Additionally, according to the present embodiments, since it is possible to collect information related to electronic commerce, it is possible to collect information related to consumption activities of more consumers, and utilize the collected information for future marketing activities.

In addition, in the present embodiment, the target EC business operator, sales business operator, payment method, type of electronic money, product, etc. can be set transversely, and conditions including the target period, target amount, payment method, etc. can be finely and flexibly set, and thus more effective promotion measures are possible. In particular, until now, it has been possible to set only simple conditions such as conditions of a purchase period and a purchased product, but according to the present embodiment, it is possible to finely set a plurality of conditions, and more effective promotion measures can be taken. Further, until now, it has been difficult to carry out a promotion measure that targets a plurality of EC business operators transversely, but according to the present embodiment, it is possible to target a plurality of EC business operators transversely, and thus more effective promotion measures can be taken. Additionally, according to the present embodiment, since it is possible to set conditions transversely, it is possible to increase the number of business operators (tie-up business operators) participating in the same promotion measure, creating a great business opportunity.

3. Second Embodiment

The above-described first embodiment of the present disclosure realizes a promotion measure for giving an incentive to a product purchase from an EC business operator. However, in reality, a channel for purchasing the product is not limited to the EC business operator, and, for example, the product may be purchased at a physical store. Therefore, in the second embodiment of the present disclosure described below, a promotion measure for giving an incentive to a product purchase from an EC business operator and a physical store is realized. The details of the second embodiment will be described below. Note that the detailed configurations of the information processing system 10 according to the present embodiment and each apparatus included in the information processing system 10 are common to the above-described first embodiment. Therefore, a detailed description of the configuration of the information processing system 10 according to the present embodiment and each apparatus included in the information processing system 10 will be omitted here.

Figure 12:
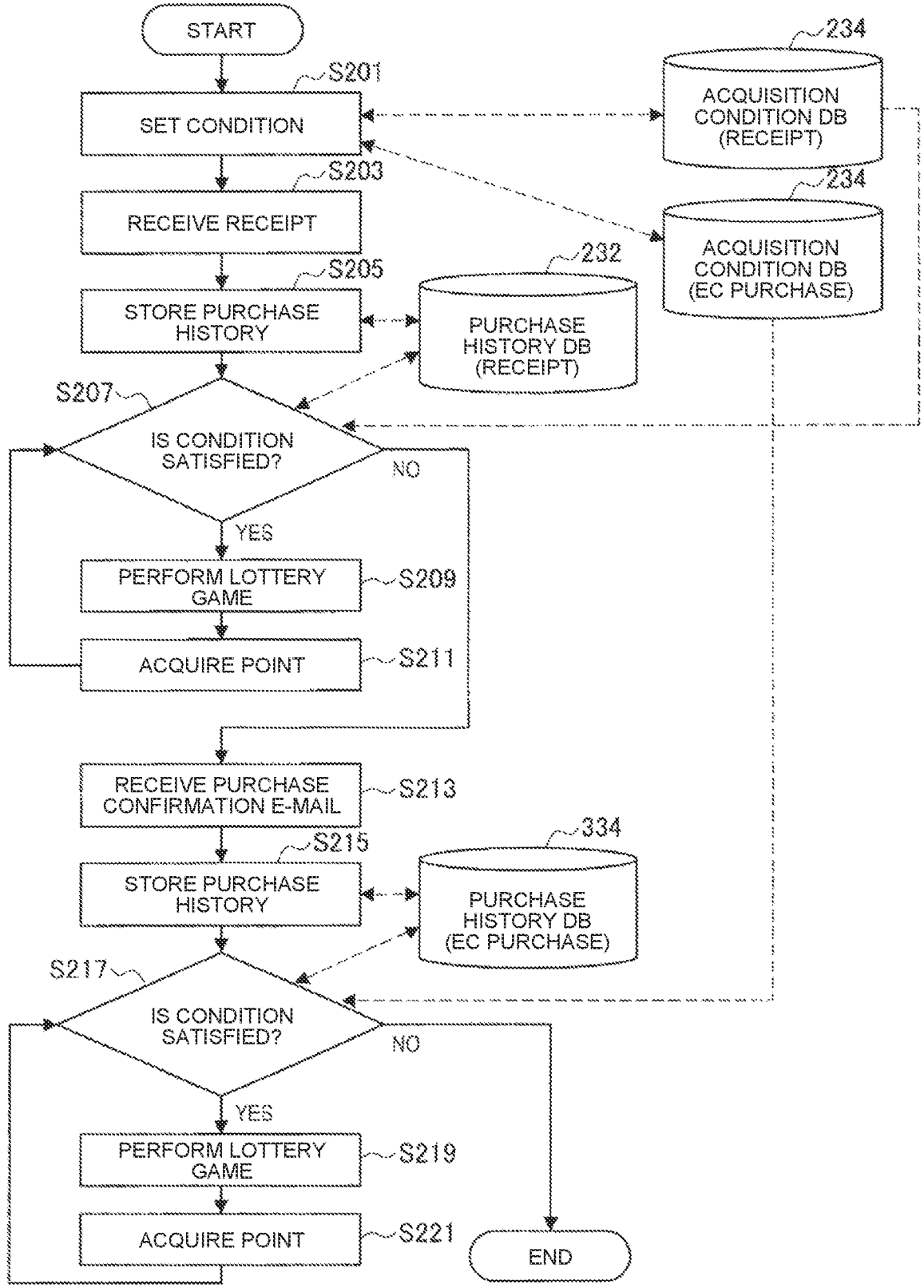
FIG. 12 is a flowchart illustrating an example of an information processing method according to the second embodiment of the present disclosure.

First, regarding the information processing method according to the present embodiment, the information processing method according to the embodiment of the present disclosure will be described with reference to FIGS. 12 and 13. FIG. 12 is a flowchart illustrating an example of the information processing method according to the present embodiment, and FIG. 13 is an explanatory diagram for explaining an example of the receipt 600 used in the present embodiment.

Specifically, as illustrated in FIG. 12, the information processing method according to the present embodiment can include a plurality of steps from Step S201 to Step S221. Details of each of these steps will be described below.

(Step S201)

Similar to the first embodiment, a business operator inputs conditions for giving the user an incentive to the service server 200 and sets the conditions. Information about the setting conditions is stored in the acquisition condition DB 234 described above.

(Step S203)

The user uses the user terminal 100 to capture an image of the receipt 600 with which it is possible to confirm that the product has been purchased from the physical store, and transmits the captured image data to the service server 200. The service server 200 receives the transmitted image data of the receipt 600.

(Step S205)

The service server 200 performs image processing and OCR on the received captured image data, and extracts the information displayed on the image data so as to be able to acquire the information of the user's purchase history (e.g., purchase product, amount of money, the number of purchases) at the physical store. For example, as illustrated in FIG. 13, when the receipt 600 includes a product code (for example, a JAN code or the like) that is associated with the product and consists of a string of numbers, the product code can be extracted and the information of the product purchased by the user can be acquired. Note that the receipt 600 illustrated in FIG. 13 is an example of the receipt 600 according to the present embodiment, and is not limited to such a form.

Then, the service server 200 stores the acquired purchase history in the purchase history DB 232.

(Step S207)

Then, the service server 200 compares the information regarding the conditions stored in the acquisition condition DB 234 with the acquired purchase history, and determines whether the user satisfies the condition for giving an incentive. When the service server 200 determines that the condition is not satisfied, the processing proceeds to Step S213, and when the condition is satisfied, the processing proceeds to Step S209.

(Step S209, Step S211)

Since Step S209 and Step S211 are the same as Step S109 and Step S111 according to the first embodiment illustrated in FIG. 8, detailed description thereof will be omitted here.

(Step S213 to Step S221)

Since Step S213 to Step S221 are the same as Step S103 to Step S111 according to the first embodiment illustrated in FIG. 8, detailed description thereof will be omitted here.

As described above, according to the present embodiment, it is possible to realize a promotion measure for giving an incentive to purchase products from EC business operators and physical stores. Therefore, according to the present embodiments, it is possible to increase the opportunities for consumers to acquire the points at each stage, which can effectively lead to the promotion of purchase of products or the like.

4. Third Embodiment

By the way, as described above, the present inventors have studied use promotion measures (campaigns) for promoting use of electronic money, for example, the right to play a game for the consumer to acquire points is given as an incentive according to the amount of use of electronic money at a physical store. Then, such use promotion measures have been advertised by business operators to consumers using the Internet or the like. However, the above-mentioned advertisement by the business operators is limited in providing strong motivation to lead the consumer to the use of electronic money because the information regarding giving an incentive from the business operator side is provided only in one direction.

Therefore, in view of the above situation, the present inventors have earnestly studied to implement a more effective use promotion measure. In such a study, the present inventors thought that it would be possible to motivate consumers to use electronic money by using the referral by an acquaintance. Specifically, it is in a situation that electronic money is not used by many consumers due to barriers that "it is difficult to use" and the "mechanism is difficult". However, the present inventors have thought that, when an acquaintance who uses electronic money on a daily basis recommends the use of electronic money, there is a sense of security that you can ask the acquaintance immediately if you have any questions regarding the use of electronic money, and it would be easier for a referree to move to the action of using electronic money. Based on such an original idea, the present inventors have arrived at the creation of the third embodiment of the present disclosure in which the function of realizing a use promotion measure for giving an incentive to the referree and the referrer according to the referral of the use of electronic money to the acquaintance is applied to the embodiment of the present disclosure described above.

That is, the third embodiment described below can realize a campaign that gives an incentive to a referrer (other user) who has referred use of predetermined electronic money and a referree (user) who has newly used the electronic money according to the referral. According to the present embodiment, since the referrer who uses the predetermined electronic money on a daily basis provides referral of the electronic money, the referree can feel a sense of security, and it is possible to promote use of electronic money by the referree. Further, according to the present embodiment, since the referrer and the referree are provided with an incentive by the use of the electronic money by the referree, a strong motivation of performing referral can be provided to the referrer and a strong motivation of use can be provided to the referree. Note that, in the present embodiment, the referral of the use of electronic money to the referree is not limited to that by the referrer, but may be referral by advertisement by business operators (store poster, newspaper advertisement, magazine advertisement, Internet advertisement, social networking service (SNS), e-mail, or the like)

Note that, in the present embodiment described below, it is possible to determine whether an incentive is given and it is possible to determine the content of an incentive given depending on the influx route through which the referree has used the electronic money. Here, the influx route specifically means a case where a referree uses electronic money as an incentive app is installed on the user terminal 100 owned by the referree by referral by a referrer (referrer may be not only a user but also a store poster or the like by a business operator), a case where a referree uses electronic money by browsing an Internet advertisement of a use promotion measure (campaign) by a business operator, or the like. In the present embodiment, it is possible to acquire information as to through what influx route the referree has passed and reached the use of electronic money by using a referral code (influx route information) described later, and because the incentive can be given to the referree according to the influx route, the use of electronic money can be more effectively promoted. Additionally, according to the present embodiment, because the business operator can collect the information related to the influx route, the collected information can be utilized for future marketing activities and advertisement activities. The details of the third embodiment of the present disclosure created by the present inventors will be sequentially described below.

<4.1 Schematic Configuration of the Information Processing System 10a>

Figure 14:
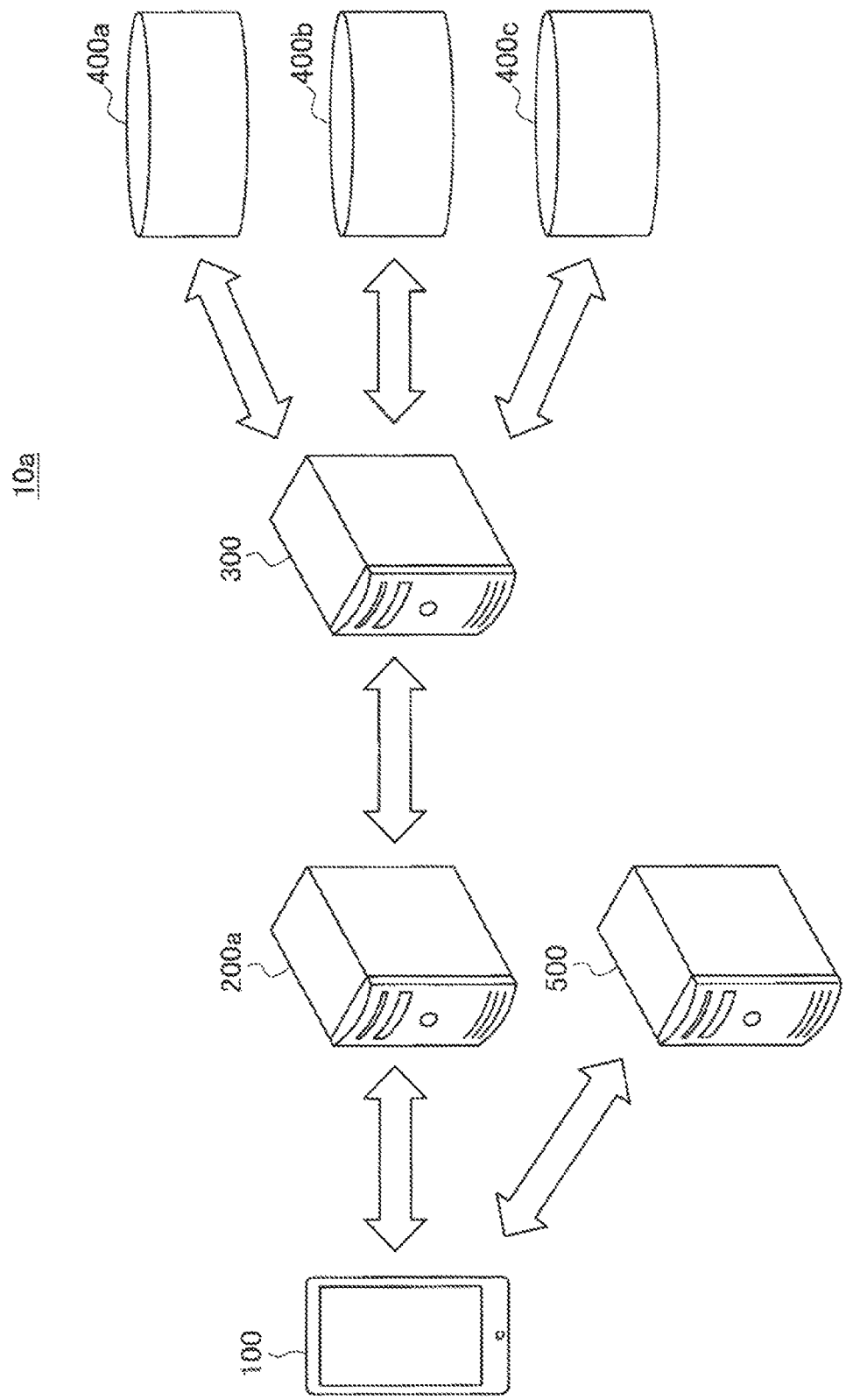
FIG. 14 is a system diagram illustrating a schematic configuration of an information processing system 10a according to a third embodiment of the present disclosure.

First, a schematic configuration of an information processing system 10a according to the third embodiment of the present disclosure will be described with reference to FIG. 14. FIG. 14 is a system diagram illustrating a schematic configuration of the information processing system 10a according to the present embodiment.

As illustrated in FIG. 14, the information processing system 10a according to the present embodiment can mainly include, for example, a user terminal 100, a service server 200a, an aggregation server 300, and a code management server 500. The user terminal 100, the service server 200a, the aggregation server 300, and the code management server 500 described above can communicate with each other via various wired or wireless communication networks (illustration omitted). Hereinafter, the overview of each apparatus included in the information processing system 10a according to the present embodiment will be described. Note that, in the present embodiment, the user terminal 100 and the aggregation server 300 are the same as those in the first embodiment, and description thereof will be omitted here.

(Service Server 200a)

As in the first embodiment, the service server 200a is, for example, a computer managed by a business operator and capable of communicating with the user terminal 100 operated by the user. For example, the service server 200a can give an incentive to the referree or the like according to the influx route leading to the use of the electronic money by the referree. Note that the above function is merely an example, and the service server 200a may have functions other than the above as appropriate. In addition, the detailed configuration of the service server 200a will be described later.

(Code Management Server 500)

The code management server 500 is a server for managing a referral code or the like for acquiring information regarding the influx route, and is a computer that can communicate with the user terminal 100 operated by the user. For example, the code management server 500 can issue a referral code in response to a request from the user terminal 100, receive the referral code received from the user terminal 100, information related to an influx route, or the like, and determine whether the condition that the referree is given an incentive is satisfied. Note that the above functions are merely examples, and the code management server 500 may have functions other than the above as appropriate. In addition, the detailed configuration of the code management server 500 will be described later.

<4.2 Detailed Configuration of the Code Management Server 500>

Figure 15:
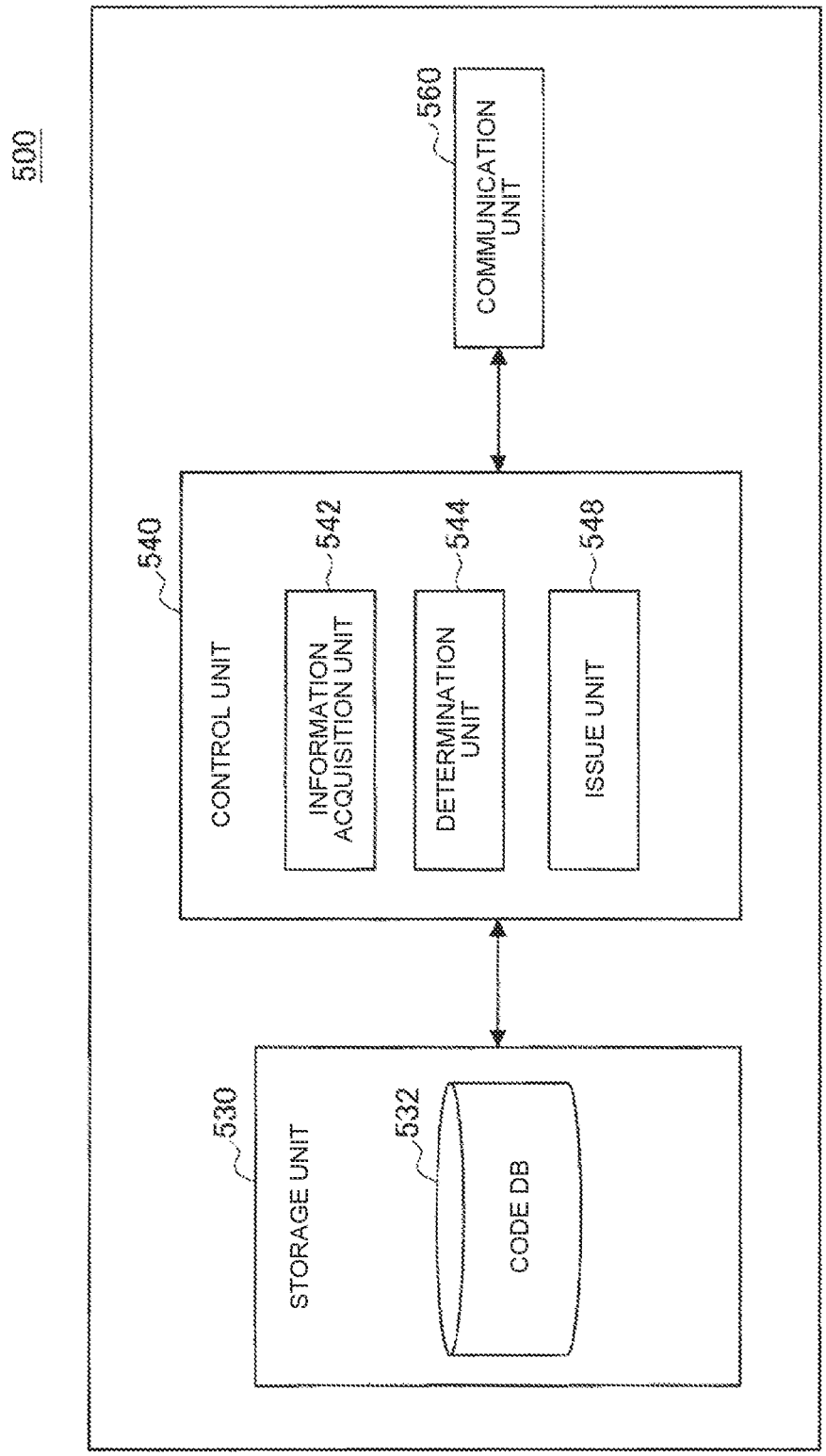
FIG. 15 is a diagram illustrating an example of functional blocks of a code management server 500 according to the third embodiment of the present disclosure.
Figure 16:
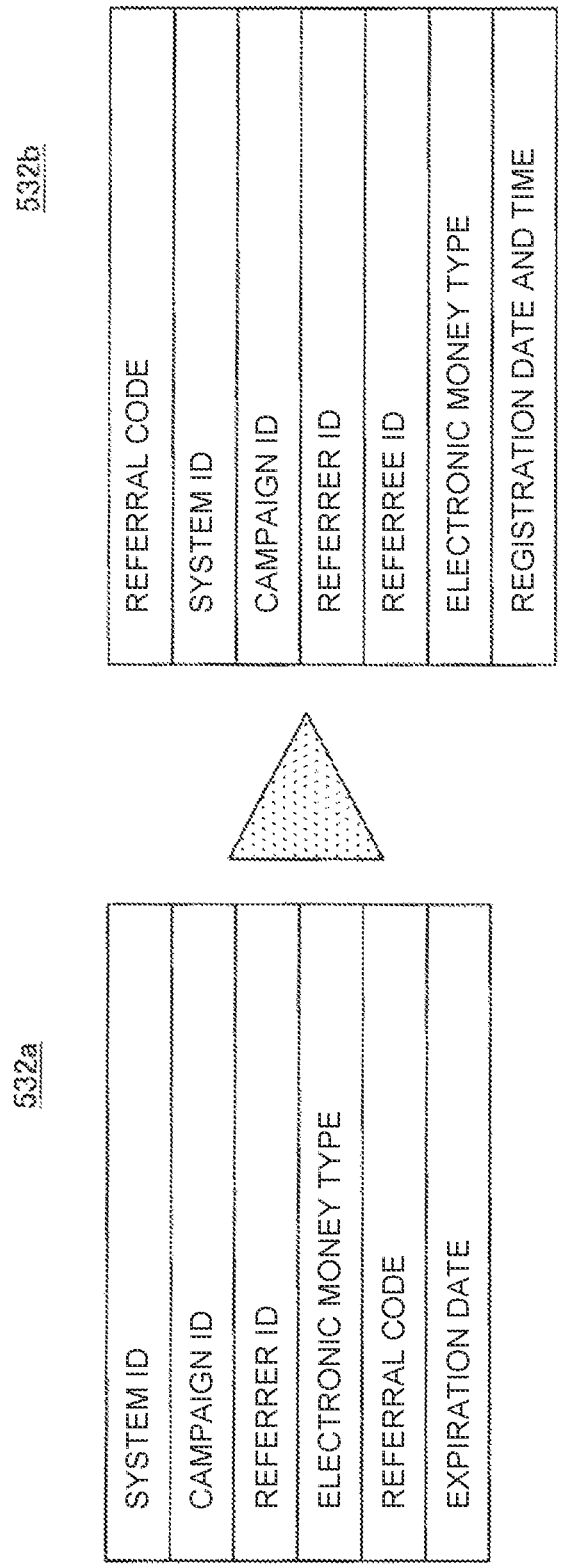
FIG. 16 is an explanatory diagram for explaining an example of a code DB 532 according to the third embodiment of the present disclosure.

The overview of the information processing system 10a according to the present embodiment has been described above. Next, a detailed configuration of the code management server 500 according to the present embodiment will be described with reference to FIGS. 15 and 16. FIG. 15 is a diagram illustrating an example of functional blocks of the code management server 500 according to the present embodiment, and FIG. 16 is an explanatory diagram for explaining an example of the code DB 532 according to the present embodiment.

The code management server 500 according to the present embodiment is a server for managing code information, as described above. Specifically, as illustrated in FIG. 15, the code management server 500 can mainly include a storage unit 530, a control unit 540, and a communication unit 560. The functional blocks of the code management server 500 will be sequentially described below.

(Storage Unit 530)

The storage unit 530 is realized by, for example, a magnetic recording medium such as a hard disk provided in the code management server 500, and stores a program for the control unit 540, which will be described later, to execute various processing, or the like, information for performing the processing, received information, and the like. For example, the storage unit 530 can store information on a referral code issued by an issue unit 548 described later. Note that the above-mentioned stored information is merely an example, and the storage unit 530 may store other information. Specifically, as illustrated in FIG. 15, the storage unit 530 stores, for example, the code DB 532.

~Code DB 532~

The code DB 532 stores information of a code (for example, a referral code) issued in response to a request from the user terminal 100 owned by the referrer. Specifically, an information acquisition unit 542 described later, as illustrated in a code DB 532a of FIG. 16, acquires a system ID, a campaign ID, a referrer ID (for example, identification information associated with an incentive app installed on the user terminal 100 owned by the referrer) transmitted from the user terminal 100 owned by the referrer, and the electronic money type used by the referrer. Then, the issue unit 548, which will be described later, issues a referral code so as to be associated with the acquired information, and the code DB 532a stores the referral code together with information of the expiration date of the referral code.

Further, the information acquisition unit 542 acquires the information such as the referral code (for example, the referral code is notified to the referree by the referrer and the referral code notified to the referree is input to the user terminal 100), the referree ID (for example, identification information associated with the incentive app installed in the user terminal 100 owned by the referrer, or the like), and the registration date and time on which the referree has input, i.e., registered, the referral code, transmitted from the user terminal 100 owned by the referree. Then, a code DB 532b illustrated in FIG. 16, along with other information associated with the referral code (system ID, campaign ID, referrer ID, electronic money type), associates and stores the information of the referree ID and the registration date and time of the referral code.

Note that the system ID is information for identifying the service server 200a described later, and the campaign ID is information for identifying a use promotion measure (campaign). The referrer ID is identification information associated with the referrer who provides referral of electronic money, and may be, for example, the identification information associated with the incentive app installed in the user terminal 100 owned by the referrer or the identification information used when the referrer uses electronic money. In addition, the referree ID is identification information associated with the referree who has received referral of electronic money, and may be, for example, the identification information associated with the incentive app installed in the user terminal 100 owned by the referrer or the identification information used when the referree uses electronic money. In addition, in addition to the above identification information, the referree ID may also include recognition information for recognizing that the referree has installed an app or the referree has browsed an Internet advertisement of the campaign. In such a case, the referree ID is transmitted to the code management server 500 and the service server 200*a* in a format including the recognition information. Further, in the present embodiment, for example, the referree ID and the referral code may have a one-to-one correspondence. In this case, by making a one-to-one correspondence, it is possible to limit the installation of the incentive app by one referral code to one for one referree.

Note that, in the above description, the referral code has been described as issued in response to a request from the user terminal 100 owned by the referrer, but the present embodiment is not limited to this. In the present embodiment, for example, it may be issued in advance in response to a request of the business operator. In this case, the code DB 532 stores the referral code issued in advance together with the information of the expiration date of the referral code.

(Control Unit 540)

The control unit 540 is realized by hardware such as a CPU, a ROM, and a RAM provided in the code management server 500, and performs various processing executed by the code management server 500. As illustrated in FIG. 15, the control unit 540 mainly includes an information acquisition unit 542, a determination unit 544, and an issue unit 548. The processing blocks included in the control unit 540 will be described below.

~Information Acquisition Unit 542~

The information acquisition unit 542 acquires the system ID, the campaign ID, the referrer ID, the electronic money type, and the like transmitted from the user terminal 100 owned by the referrer, and output the acquired information to issue unit 548 and the storage unit 530, which will be described later. In addition, the information acquisition unit 542 acquires information such as the referral code, the referree ID, the registration date and time of the referral code, and the like transmitted from the user terminal 100 owned by the referree, and outputs them to the determination unit 544 and the storage unit 530. In the present embodiment, since the referral code and the referrer ID can be acquired, it is possible to recognize through what referral by the referrer (influx route) the referree has reached the use of electronic money.

In addition, the information acquisition unit 542 may acquire the referral code from a uniform resource locator (URL) parameter of an Internet advertisement page of a campaign by a business operator, which has been transmitted from the user terminal 100 owned by the referree and browsed by the referree. Specifically, when the referree browses the page related to the above URL by using the owned user terminal 100, the user terminal 100 transmits the value designated by the URL parameter to the code management server 500, and the referral code can be acquired. Further, the user terminal 100 can install or activate the incentive app according to the present embodiment triggered by the browsing of the page related to the URL. Therefore, in the present embodiment, it is possible to recognize that the referree has arrived at the use of the electronic money after browsing the Internet advertisement (influx route). In this case, the information acquisition unit 542 also acquires the information of the date and time when the referree browsed the Internet advertisement together with the referral code, and outputs the acquired information to the determination unit 544 and the storage unit 530. Note that the above processing contents are merely examples, and the information acquisition unit 542 may perform other processing.

~Determination Unit 544~

The determination unit 544 compares the referral code or the like (for example, referral code, system ID, campaign ID, referrer ID, electronic money type, expiration date, or the like) stored in the code DB 532 with the referral code or the like (for example, referral code, registration date and time, referree ID, electronic money type, or the like) acquired from the user terminal 100 owned by the referree, and determines whether the referral code input by the referree is an appropriate referral code. Specifically, the information acquisition unit 542 described above acquires the referral code input by the referree and the information of the registration date and time from the user terminal 100 owned by the referree, and outputs them to the determination unit 544. The determination unit 544 compares the referral code and the registration date and time acquired from the information acquisition unit 542 with the referral code stored in the code DB 532 of the storage unit 530 and the information associated with the referral code, and determines whether registration has been made within the expiration date and whether there is a double taking of incentives (for example, the same referree is repeatedly referred). Then, the determination unit 544 transmits the determination result to the user terminal 100 owned by the referree. Note that the above processing contents are merely examples, and the determination unit 544 may perform other processing.

~Issue Unit 548~

The issue unit 548 can generate the referral code described above. Specifically, the issue unit 548 issues, for example, a referral code including numbers, characters, and the like in response to a request from the user terminal 100. More specifically, the issue unit 548 issues a referral code in association with the system ID, the campaign ID, the referrer ID, the electronic money type, and the like transmitted from the user terminal 100 owned by the referrer, and outputs the referral code together with the information of the expiration date of the referral code to the storage unit 530. Further, the issue unit 548 transmits the issued referral code to the user terminal 100 owned by the referrer.

Note that, as described above, the issue unit 548 has been described to issue a referral code in response to a request from the user terminal 100 owned by the referrer, but the present embodiment is not limited to this. The issue unit 548 may issue the referral code in advance, for example, in response to a request from a business operator. In this case, the referral code issued in advance will be notified to the user (referree) through the advertisement of the business operator (for example, a store poster, Internet advertisement, or the like).

(Communication Unit 560)

The communication unit 560 is realized by, for example, a communication device such as a transmission/reception circuit and a port, and can transmit and receive information to and from the user terminal 100 or the like.

Note that the various functional blocks illustrated in FIG. 15 are merely examples, and the code management server 500 may have other functional blocks not illustrated in FIG. 15.

<4.3 Detailed Configuration of the Service Server 200*a*>

Figure 17:
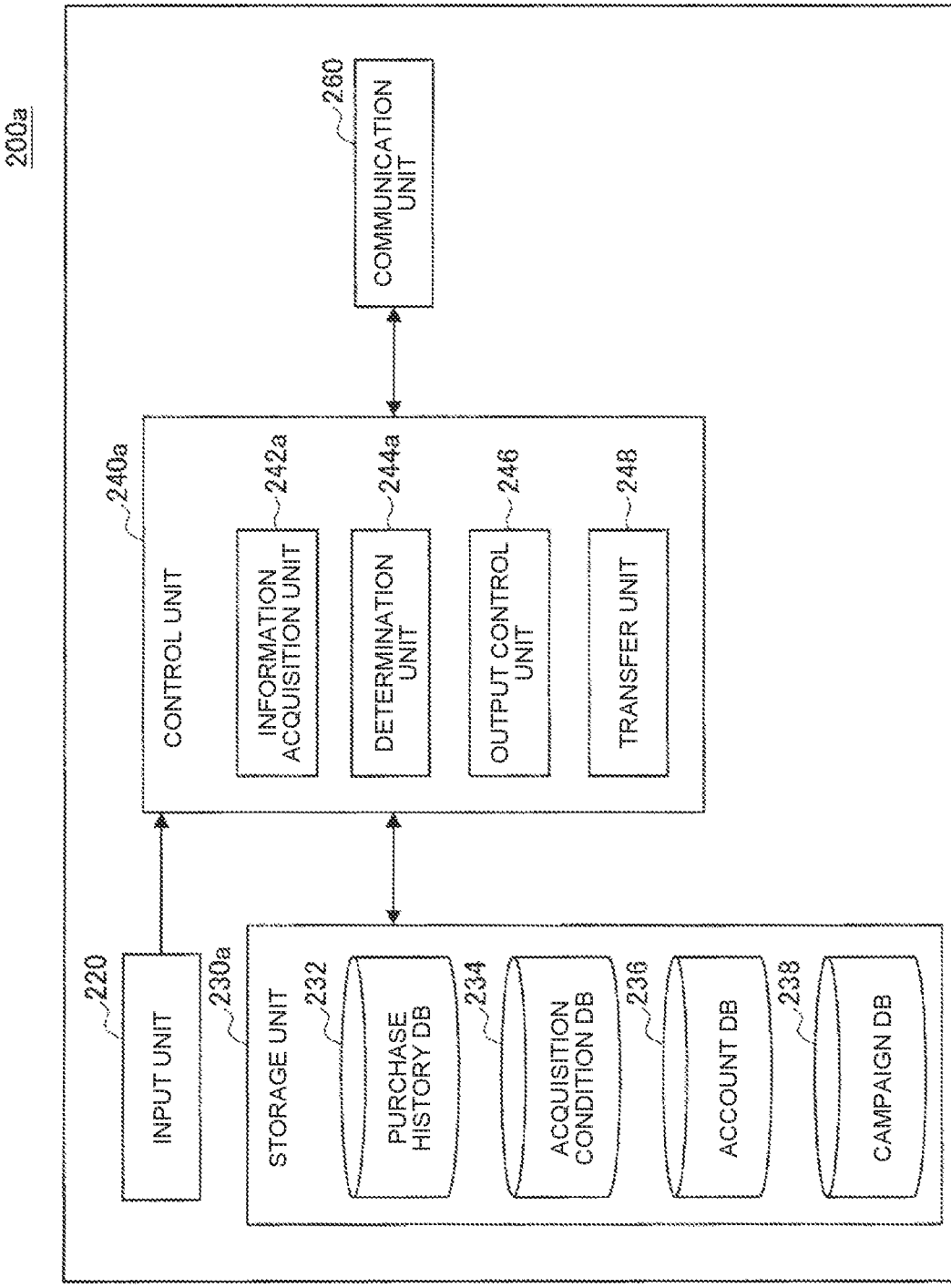
FIG. 17 is a diagram illustrating an example of functional blocks of a service server 200a according to the third embodiment of the present disclosure.

The detailed configuration of the code management server 500 according to the present embodiment has been described above. Next, the detailed configuration of the service server 200*a* according to the present embodiment will be described with reference to FIGS. 17 and 18. FIG. 17 is a diagram illustrating an example of functional blocks of the service server 200*a* according to the present embodiment, and FIG.

18 is an explanatory diagram for explaining an example of the campaign DB 238 according to the present embodiment.

As described above, the service server 200a according to the present embodiment is a computer for giving an incentive to the referree and the referrer according to the influx route in which the user has reached the use of electronic money. Specifically, as illustrated in FIG. 17, the service server 200a can mainly include an input unit 220, a storage unit 230a, a control unit 240a, and a communication unit 260. The functional blocks of the service server 200a will be sequentially described below. Note that, here, detailed description of the points common to the service server 200 according to the above-described first embodiment will be omitted, and only different points will be described.

(Storage Unit 230a)

The storage unit 230a is realized by, for example, a magnetic recording medium such as a hard disk provided in the service server 200a, and stores a program or the like for the control unit 240a, which will be described later, to execute various processing. Specifically, as illustrated in FIG. 17, the storage unit 230a further stores a campaign DB 238 in addition, for example, to the purchase history DB 232, the acquisition condition DB 234, and the account DB 236. Note that, here, the purchase history DB 232, the acquisition condition DB 234, and the account DB 236 are common to those of the first embodiment, and thus detailed description thereof will be omitted.

~Campaign DB 238~

As illustrated in FIG. 18, the campaign DB 238 stores information regarding the conditions for giving incentives, which is input by a business operator. Specifically, as illustrated in FIG. 15, the campaign DB 238 stores the identification information (system ID) for identifying the service server 200a, the identification information (campaign ID) for identifying the campaign, the type of electronic money, the influx route (for example, referral code, or the like), electronic money issuance conditions (for example, issue amount, issuance period, or the like), electronic money use conditions (for example, use amount, use period, or the like), which are targets for giving an incentive to the user. In addition, the campaign DB 238 stores the content of the incentive to be given, a message displayed at the time of giving, a URL parameter as a transition destination, and the like. Note that the various types of information described above are merely examples, and the campaign DB 238 may store other types of information.

(Control Unit 240a)

The control unit 240a is realized by hardware such as a CPU, a ROM, and a RAM provided in the service server 200a, and performs various processing executed by the service server 200a. As illustrated in FIG. 17, the control unit 240a mainly includes an information acquisition unit 242a, a determination unit 244a, and an output control unit 246, and a transfer unit 248. The processing blocks included in the control unit 240a will be described below. Note that, here, detailed description of the points common to the control unit 240 of the service server 200 according to the above-described first embodiment will be omitted, and only different points will be described.

~Information Acquisition Unit 242a~

The information acquisition unit 242a can acquire the determination result of the system ID, the campaign ID, the type of electronic money, and the referral code (the determination result by the determination unit 544 described above) from the user terminal 100 owned by the referree. Further, the information acquisition unit 242a can also acquire, from the user terminal 100, information of the type of electronic money issued by the referree, the amount of money and the date and time of issue, the type of electronic money used by the referree, the amount of money and the date and time of issue. Then, the information acquisition unit 242a outputs the acquired information to the determination unit 244a described later. Note that the above processing contents are merely examples, and the information acquisition unit 242a may perform other processing.

~Determination unit 244a~

The determination unit 244a compares the information acquired by the information acquisition unit 242a from the user terminal 100 owned by the referree with the information regarding the conditions stored in the campaign DB 238, and determines whether the referree satisfies the condition of giving an incentive. Then, the determination unit 244a outputs the determination result to the output control unit 246. Note that the above processing contents are merely examples, and the determination unit 244a may perform other processing.

Note that the various functional blocks illustrated in FIG. 17 are merely examples, and the service server 200a may have other functional blocks not illustrated in FIG. 17.

<4.4 Information Processing Method>

The detailed configuration of each apparatus included in the information processing system 10a according to the present embodiment has been described above. Next, the information processing method according to the present embodiment will be described. Specifically, the information processing method according to the present embodiment mainly has three stages: a referral code issuance stage, an incentive giving stage by referral code, and an incentive giving stage by Internet advertisement. Hereinafter, each of these stages will be sequentially described.

(4.4.1 Referral Code Issuance Stage)

Figure 19:
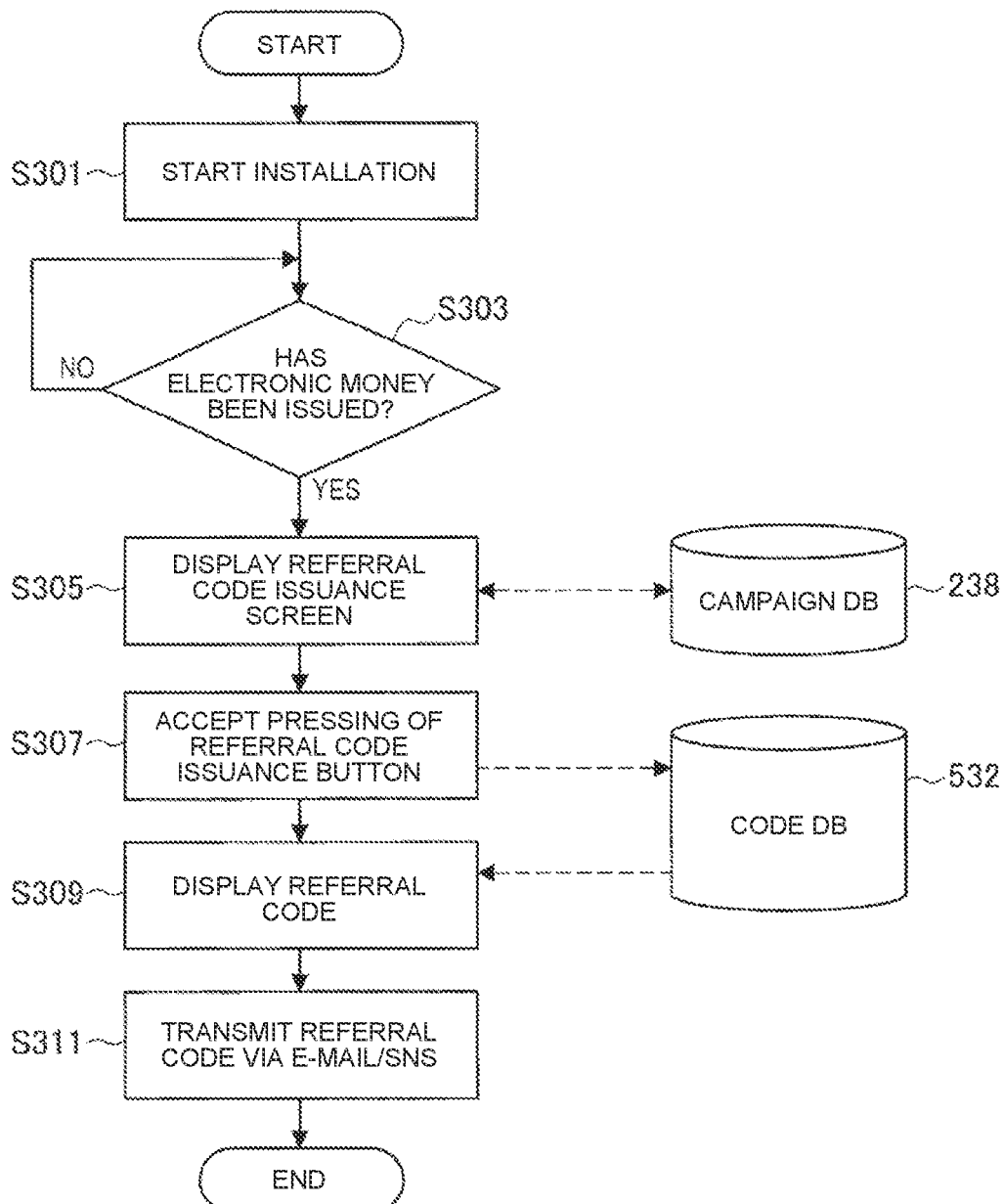
FIG. 19 is a flowchart (part 1) illustrating an example of the information processing method according to the third embodiment of the present disclosure.
Figure 20:
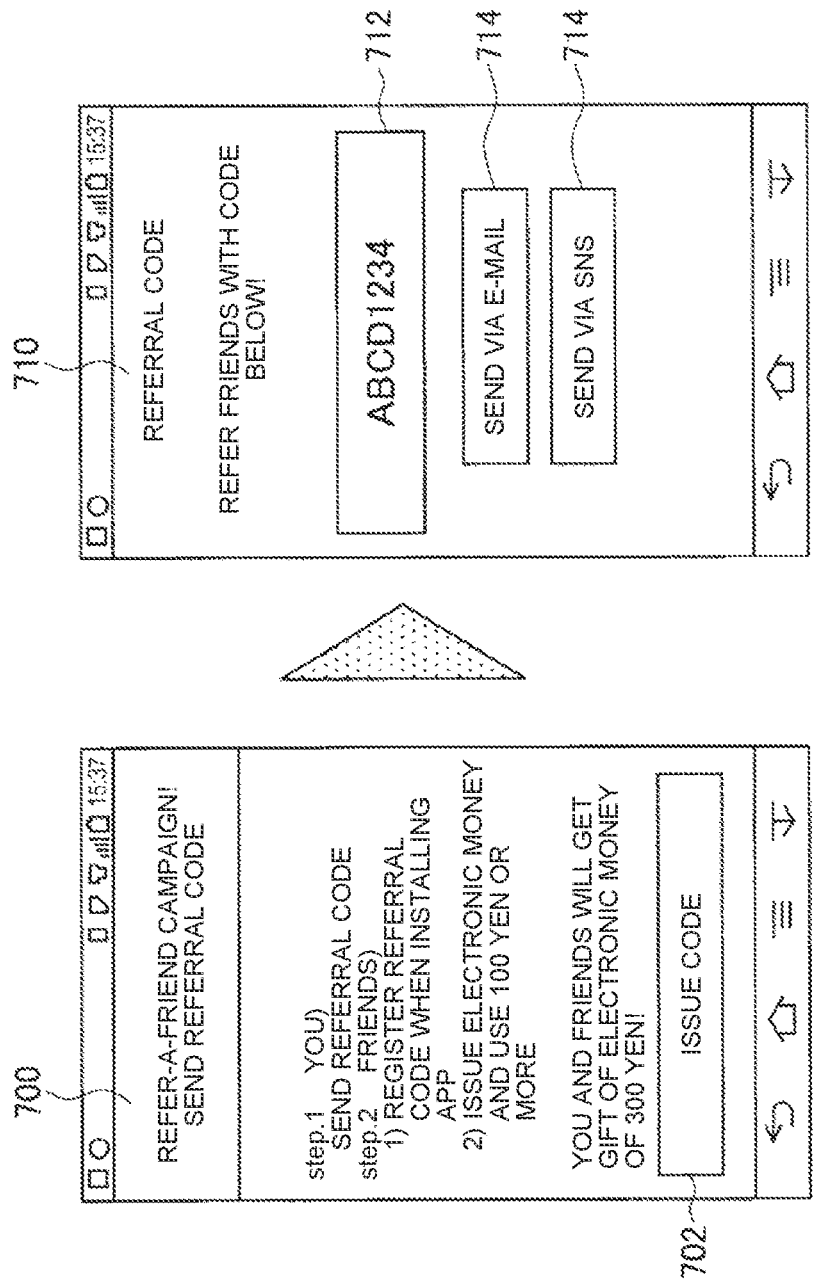
FIG. 20 is an explanatory diagram for explaining an example of display screens 700 and 710 for issuing a referral code according to the third embodiment of the present disclosure.

First, the referral code issuance stage according to the present embodiment will be described with reference to FIGS. 19 and 20. FIG. 19 is a flowchart illustrating an example of the information processing method according to the present embodiment, and specifically a flowchart of the referral code issuance stage according to the present embodiment. In addition, FIG. 20 is an explanatory diagram for explaining an example of display screens 700 and 710 for issuing a referral code according to the present embodiment.

Specifically, the referral code issuance stage according to the present embodiment can include a plurality of steps from Step S301 to Step S311 as illustrated in FIG. 19. Details of each of these steps will be described below.

~Step S301~

When the incentive app is not installed in the user terminal 100 owned by the referrer, the incentive app is installed in Step S301.

~Step S303~

The user terminal 100 issues predetermined electronic money according to the operation of the referrer. Note that before the information processing method according to the present embodiment is executed, it is assumed that the user terminal 100 has an electronic money app for issuing and using predetermined electronic money. The user terminal 100 proceeds to Step S305 when the predetermined electronic money is issued, and repeats Step S303 when the electronic money is not issued. As described above, in the present embodiment, in order to issue the referral code in Step S305, which will be described later, issuance of electronic money is a condition. That is, in the present embodiment, referral of the electronic money can be performed only by the referrer who uses the predetermined electronic money.

~Step S305~

Using the issuance of the predetermined electronic money in Step S303 as a trigger, the user terminal 100 uses the incentive app to acquire referral code issuance screen data stored in the campaign DB 238 of the service server 200*a*. Further, the user terminal 100 displays the referral code issuance screen. For example, the user terminal 100 displays a referral code issuance screen 700 as illustrated on the left side of FIG. 20. The referral code issuance screen 700 includes a referral issuance button 702 for accepting an operation for requesting the issuance of the referral code by the referrer. Note that the referral code issuance screen 700 illustrated in FIG. 20 is an example of the referral code issuance screen, and the present embodiment is not limited to such a form.

~Step S307~

The user terminal 100 accepts an operation with respect to the referral issuance button 702 by the referrer. Then, the user terminal 100 transmits information such as the system ID, the campaign ID, the referrer ID, the electronic money type, or the like, to the code management server 500, and requests the code management server 500 to issue a referral code.

~Step S309~

The code management server 500, which has received the request to issue the referral code, issues a referral code and transmits it to the user terminal 100. The user terminal 100 displays the received referral code. For example, the user terminal 100 displays the referral code issuance screen 710 as illustrated on the right side of FIG. 20. The referral code issuance screen 710 includes a display column 712 for displaying the issued referral code, and a transmission button 714 for accepting an operation for requesting the transmission of the referral code to the referree. Note that the referral code issuance screen 710 illustrated in FIG. 20 is an example of the referral code issuance screen, and the present embodiment is not limited to such a form.

~Step S311~

The user terminal 100 accepts an operation with respect to the transmission button 714 by the referrer. Then, the user terminal 100 transmits the referral code to the referree via e-mail, SNS, or the like. As described above, the referral code issuance stage according to the present embodiment is executed, and the processing ends. Further, at the incentive giving stage by referral code, which will be described later, when the processing using the referral code received by the referree is executed, the referree and the referrer are given an incentive.

(4.4.2 Incentive Giving Stage by Referral Code)

Figure 21:
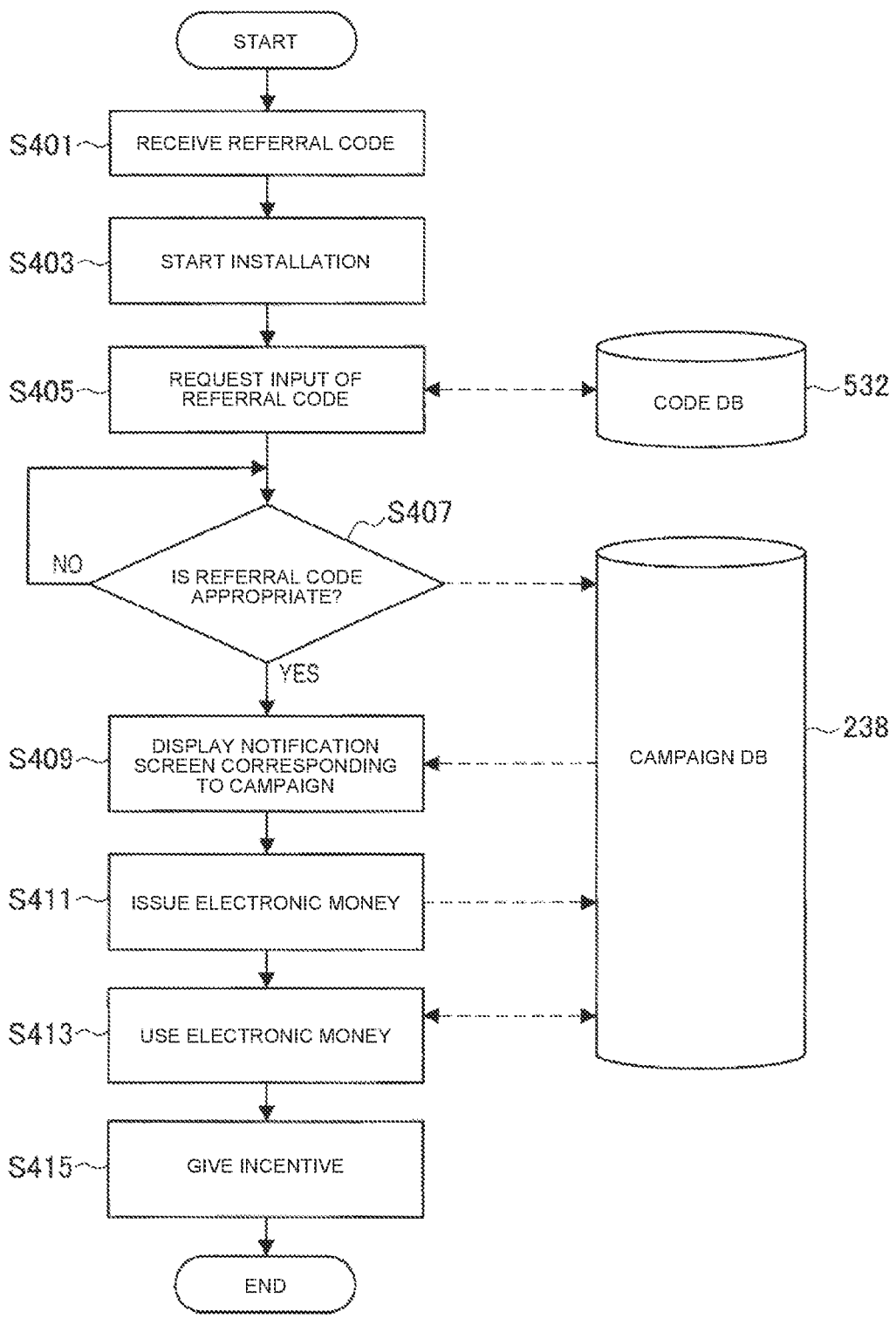
FIG. 21 is a flowchart (part 2) illustrating an example of the information processing method according to the third embodiment of the present disclosure.
Figure 22:
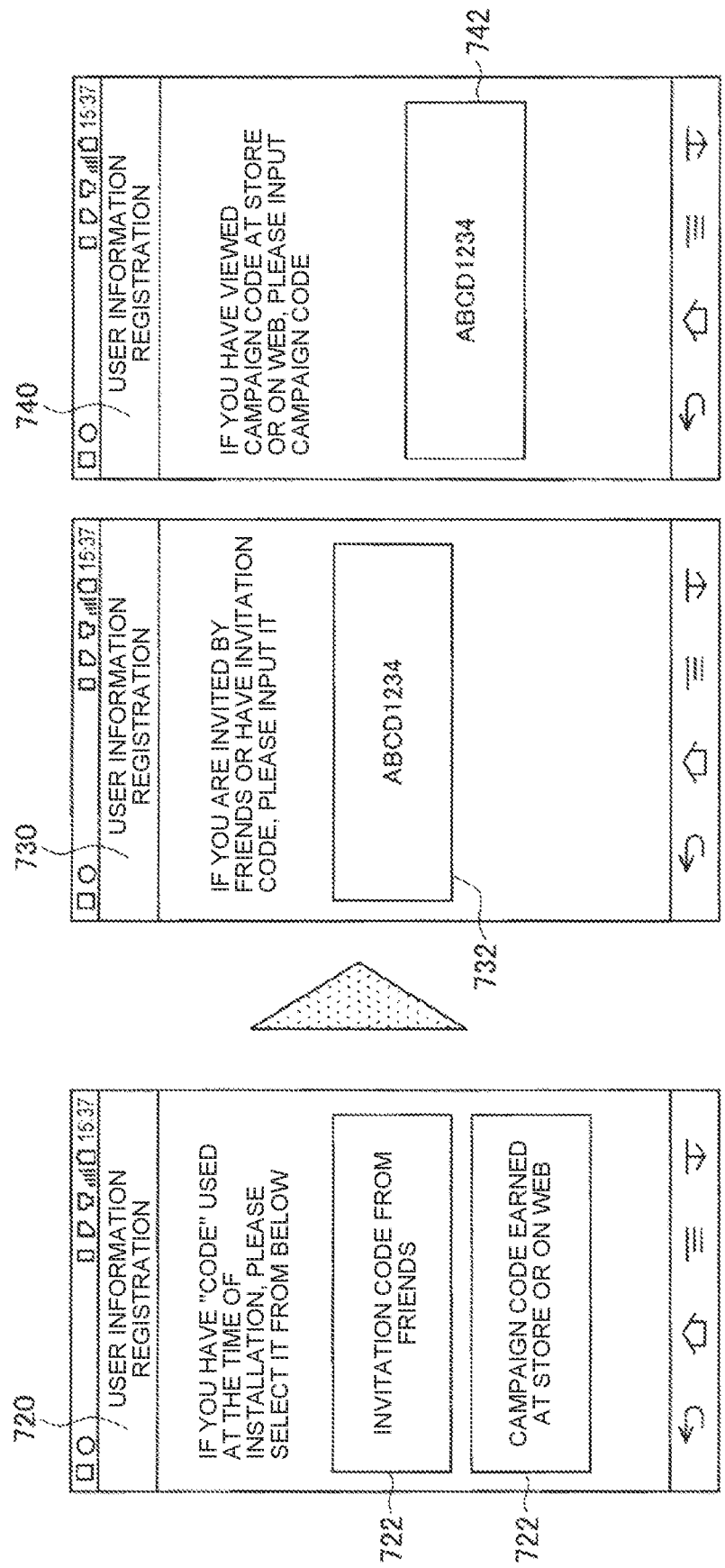
FIG. 22 is an explanatory diagram for explaining an example of referral code input screens 720, 730, and 740 according to the third embodiment of the present disclosure.

Next, the incentive giving stage by referral code according to the present embodiment will be described with reference to FIGS. 21 and 22. FIG. 21 is a flowchart illustrating an example of the information processing method according to the present embodiment, and specifically a flowchart of the incentive giving stage by referral code according to the present embodiment. In addition, FIG. 22 is an explanatory diagram for explaining an example of referral code input screens 720, 730, and 740 according to the present embodiment.

Specifically, the incentive giving stage by referral code according to the present embodiment can include a plurality of steps from Step S401 to Step S415 as illustrated in FIG. 21. Details of each of these steps will be described below.

~Step S401~

The user terminal 100 owned by the referree receives the referral code from the referrer.

~Step S403~

When the incentive app is not installed in the user terminal 100, the incentive app is installed in Step S403.

~Step S405~

The user terminal 100 requests the referree to input a referral code in the middle stage of installation of the incentive app. For example, the user terminal 100 displays the referral code input screen 720 as illustrated on the left side of FIG. 22. The referral code input screen 720 includes an input button 722 for accepting an operation of requesting a transition to a screen for inputting the issued referral code. Then, when the referree operates the input button 722, the user terminal 100 displays the referral code input screen 730 as illustrated in the center of FIG. 22. The referral code input screen 730 includes an input column 732 for inputting the issued referral code. Note that the referral code input screens 720 and 730 illustrated in FIG. 22 are examples of the referral code issuance screen, and the present embodiment is not limited to such a form.

Then, when the referree inputs the referral code received from the referrer in the input column 732, the user terminal 100 transmits the input referral code together with the information of the referree ID and the input (registration) date and time of the referral code to the code management server 500.

Further, the code management server 500 determines whether or not the referral code input by the referree is an appropriate referral code, and when the referral code is determined to be appropriate, transmits the determination result to the user terminal 100 together with the information such as the system ID, the campaign ID, the referrer ID, the type of electronic money, or the like associated with the referral code. In addition, when the code management server 500 determines that the referral code is not appropriate, the code management server 500 transmits the determination result to the user terminal 100. Note that, at this time, since there is a double taking of incentives by a malicious user, it is preferable that the code management server 500 determine whether there is no double taking or the like.

~Step S407~

When the referral code is an appropriate referral code, the user terminal 100 acquires information such as the system ID, the campaign ID, the referrer ID, the type of electronic money, the referral code determination result, or the like, from the code management server 500. Then, the user terminal 100 transmits the acquired information to the service server 200*a*. On the other hand, when the referral code is not an appropriate referral code, the user terminal 100 repeats Step S407.

~Step S409~

The service server 200*a* acquires from the user terminal 100 information such as the system ID, the campaign ID, the type of electronic money, the referral code determination result, or the like. Further, the service server 200 determines which campaign these pieces of information correspond to, and transmits the image data of a notification screen corresponding to the corresponding campaign to the user terminal 100. Then, the user terminal 100 displays the notification screen.

~Step S411~

The user terminal 100 issues predetermined electronic money according to the operation of the referree. Then, the user terminal 100 transmits, to the service server 200*a*, together with the referree ID, information such as the type of electronic money issued by the referree, the amount of money, the date and time of issuance, or the like.

~Step S413~

The user terminal 100 uses predetermined electronic money according to the operation of the referree. Then, the user terminal 100 transmits, to the service server 200a, together with the referree ID, information such as the type of electronic money used by the referree, the amount of money, the date and time of issuance, or the like.

~Step S415~

The service server 200a determines whether or not the referree satisfies the conditions for giving an incentive on the basis of the information acquired in Steps S411 and S413. When the referree satisfies the conditions for giving an incentive, the incentive is given to both the referree and the referrer. The incentive may be, for example, giving the right to execute a lottery game as in the first embodiment. However, in the present embodiment, the giving of an incentive is not limited to the lottery game, but, for example, points may be given to both the referree and the referrer without the execution of such a game, and discount coupons may be provided to both. As described above, the incentive giving stage by referral code according to the present embodiment is executed, and the processing ends.

Additionally, according to the present embodiment, the incentive can be given on condition that, in addition to the installation of the incentive app, the referree issues and uses predetermined electronic money, and therefore use of electronic money can be promoted more strongly.

Note that although the above-mentioned referral code has been described as being the referral code transmitted by the referrer, in the present embodiment, as described above, it may be a referral code notified to the referree via an advertisement (store poster or the like) of a business operator. In such a case, the execution of Step S401 is omitted. Further, in such a case, in Step S405, for example, the user terminal 100 displays the referral code input screen 720 as illustrated on the left side of FIG. 22, then the referree uses the operation on the input button 722 as a trigger, and the referral code input screen 740 as illustrated on the right side of FIG. 22 is displayed. The referral code input screen 740 includes an input column 742 for inputting the issued referral code. Note that the referral code input screen 740 illustrated in FIG. 22 is an example of the referral code issuance screen, and the present embodiment is not limited to such a form.

(4.4.3 Incentive Giving Stage by Internet Advertisement)

Figure 23:
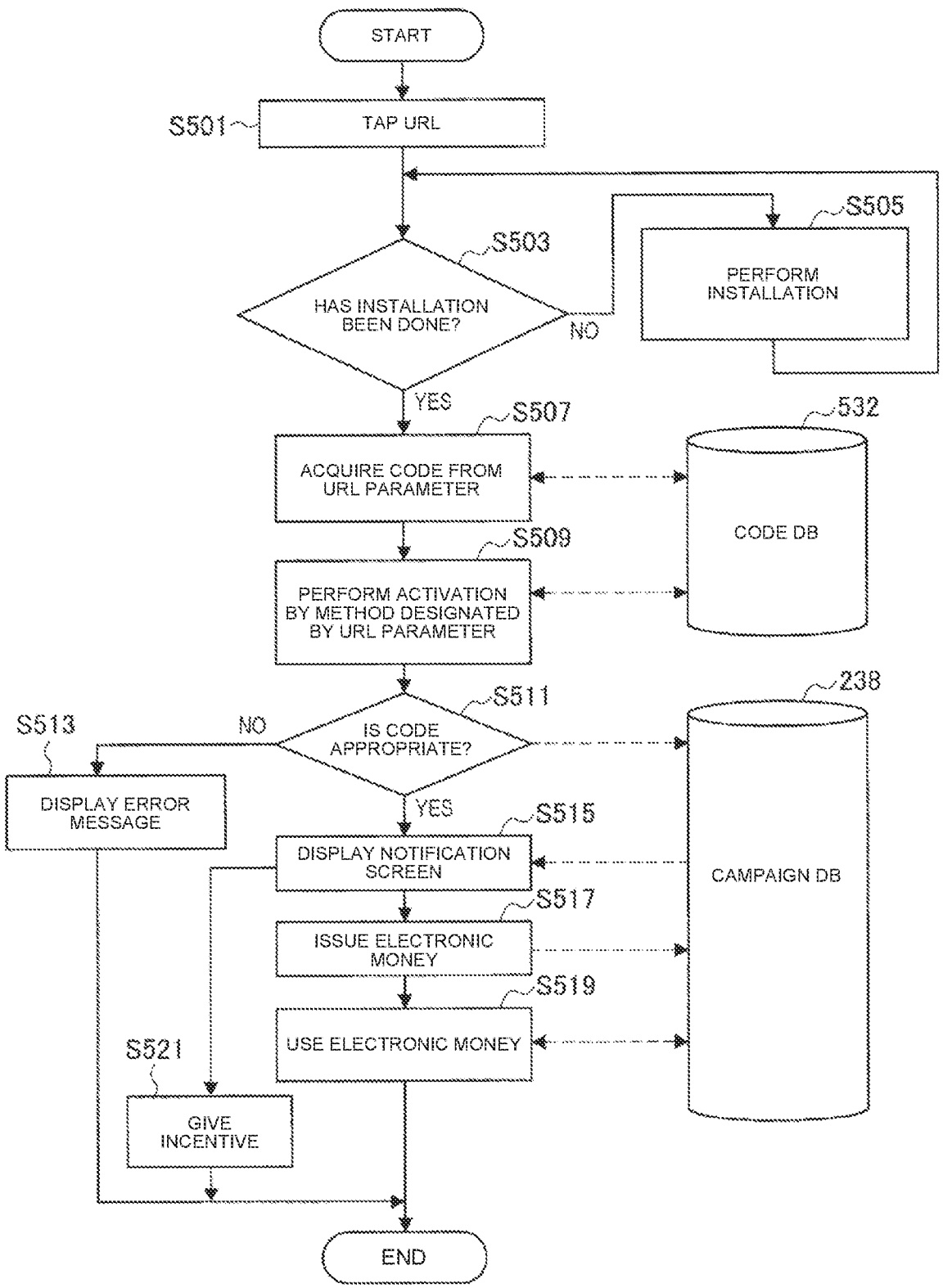
FIG. 23 is a flowchart (part 3) illustrating an example of the information processing method according to the third embodiment of the present disclosure.

Next, the incentive giving stage by Internet advertisement according to the present embodiment will be described with reference to FIG. 23. FIG. 23 is a flowchart illustrating an example of the information processing method according to the present embodiment, and specifically a flowchart of the incentive giving stage by Internet advertisement according to the present embodiment.

Specifically, the incentive giving stage by Internet advertisement according to the present embodiment can include a plurality of steps from Step S501 to Step S521 as illustrated in FIG. 23. Details of each of these steps will be described below.

~Step S501~

The referree browses the Internet advertisement of a campaign by a business operator via the user terminal 100 owned by the referree, and operates (taps) a predetermined part of the page related to the advertisement.

~Step S503~

The service server 200a transmits and receives information to/from the user terminal 100 and determines whether the incentive app is installed in the user terminal 100. When the service server 200a, when the app is not installed, proceeds to Step S505, and when it is installed, the proceeds to Step S507.

~Step S505~

The incentive app is installed in the user terminal 100. After the installation is completed, the user terminal 100 returns to Step S503 described above.

~Step S507~

The user terminal 100 acquires the referral code from the URL parameter of the page of the Internet advertisement by using the operation of the referree at a predetermined part of the Internet advertisement in Step S501 as a trigger. Then, the user terminal 100 transmits the acquired referral code together with the information of the referree ID and the acquisition (registration) date and time of the referral code to the code management server 500.

~Step S509~

The user terminal 100 activates the incentive app. At this time, the user terminal 100 can acquire the information specifying the activation method from the URL parameter, and starts the incentive app on the basis of the acquired specifying information.

Further, the code management server 500 determines whether or not the received referral code is an appropriate referral code, and when the referral code is determined to be appropriate, transmits the determination result to the user terminal 100 together with the information such as the system ID, the campaign ID, the referrer ID, the type of electronic money, or the like associated with the referral code. In addition, when the code management server 500 determines that the referral code is not appropriate, the code management server 500 transmits the determination result to the user terminal 100. Note that, at this time, it is preferable that the code management server 500 also determine whether or not there is a double taking.

~Step S511~

When the referral code is an appropriate referral code, the user terminal 100 acquires information such as the system ID, the campaign ID, the referrer ID, the type of electronic money, the referral code determination result, or the like, from the code management server 500. Then, the user terminal 100 transmits the acquired information to the service server 200a and proceeds to Step S515. On the other hand, when the referral code is not an appropriate referral code, the user terminal 100 proceeds to Step S513.

~Step S513~

The user terminal 100 displays an error message and ends the processing.

~Step S515, Step S517, Step S519 and Step S521~

Since Step S515 is the same as Step S409, Step S411, Step S413, and Step S415 of FIG. 21 described above, detailed description thereof is omitted here.

Note that, in the present embodiment, on the basis of the information transmitted from the user terminal 100 to the service server 200a at the time of browsing of the Internet advertisement, such as the date and time of browsing, the referree ID, or the like, it is possible to recognize whether the referree has arrived at issuing and using predetermined electronic money after browsing a predetermined Internet advertisement.

In addition, in the present embodiment, the function of the code management server 500 may be executed by the service server 200a, and the processing apparatus is not particularly limited.

As described above, according to the present embodiment, since the referrer who uses the predetermined electronic money on a daily basis provides referral of the electronic money, the referree can feel a sense of security, and it is possible to promote use of electronic money by the referree. Further, according to the present embodiment, since the referrer and the referree are provided with an incentive by the use of the electronic money by the referree, a strong motivation of performing referral can be provided to the referrer and a strong motivation of use can be provided to the referree.

Additionally, in the present embodiment, it is possible to acquire information as to through what influx route the referree has passed and reached the use of electronic money, and because the incentive can be given to the referree according to the influx route, the use of electronic money can be more effectively promoted. Further, according to the present embodiment, because the business operator can collect the information related to the influx route, the collected information can be utilized for future marketing activities and advertisement activities.

Note that, in the above description, the third embodiment is described to be performed by the information processing system 10a in which a predetermined apparatus is added to the information processing system 10 according to the first embodiment or second embodiment of the present disclosure described above, but is not limited to this. For example, the third embodiment may be implemented alone by the information processing system 10a that can implement only the embodiment.

5. Conclusion

As described above, according to each of the embodiments of the present disclosure described above, it is possible to effectively carry out a promotion measure.

6. Hardware Configuration

Figure 24:
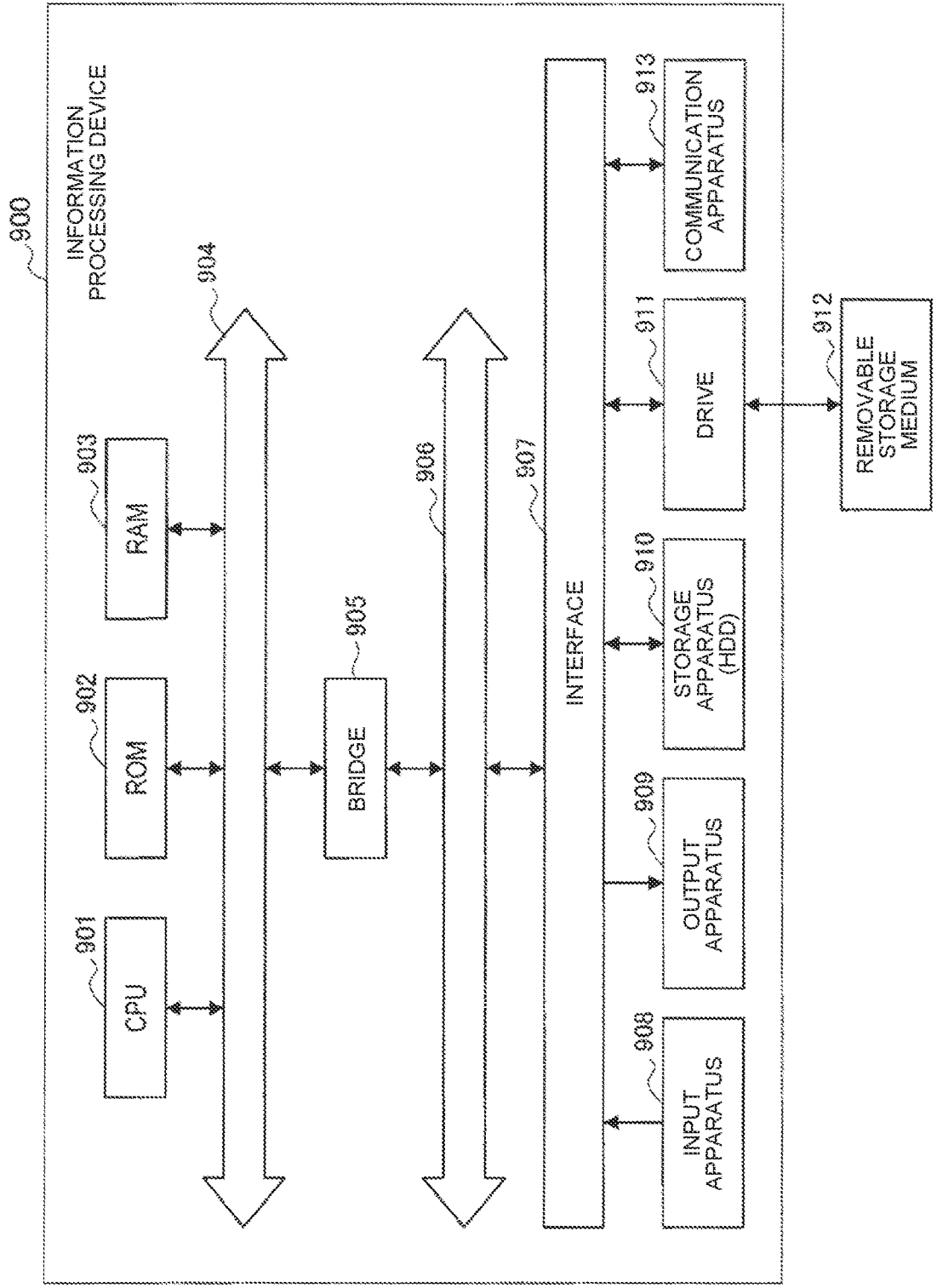
FIG. 24 is a block diagram for explaining a hardware configuration of an information processing device 900 according to the embodiment of the present disclosure.

Next, with reference to FIG. 24, a hardware configuration of the user terminal 100, the service server 200, the aggregation server 300, and the code management server 500 according to the embodiment of the present disclosure will be described. FIG. 24 is a block diagram for explaining a hardware configuration of an information processing device according to the embodiment of the present disclosure. The illustrated information processing device 900 can realize, for example, the user terminal 100, the service server 200, the aggregation server 300, and the code management server 500 according to the above-described embodiment.

The information processing device 900 has a CPU 901, a ROM 902, a RAM 903, and a host bus 904. In addition, the information processing device 900 includes a bridge 905, an external bus 906, an interface 907, an input apparatus 908, an output apparatus 909, a storage apparatus 910, a drive 911, a removable storage medium 912, and a communication apparatus 913.

The CPU 901 functions as an arithmetic processing apparatus and a control apparatus, and controls the entire operation or part of the operation of the information processing device 900 according to various programs recorded in the ROM 902, the RAM 903, the storage apparatus 910, or the removable recording medium 912. The ROM 902 stores a program, calculation parameters, and the like used by the CPU 901. The RAM 903 temporarily stores the programs used in the execution of the CPU 901 and the parameters that suitably vary in this execution, and the like. The CPU 901, the ROM 902, and the RAM 903 are mutually connected through the host bus 904 composed of an internal bus such as CPU bus. Further, the host bus 904 is connected to the external bus 906 such as a peripheral component interconnect/interface (PCI) bus via the bridge 905. Note that the host bus 904, bridge 905, and external bus 906 are not necessarily configured separately and that these functions may be implemented by one bus.

The input apparatus 908 is configured from input means whereby a user inputs information, such as a mouse, a keyboard, a touch panel, a button, a microphone, a switch, and a lever, and an input control circuit that generates an input signal on the basis of inputs by the user and that outputs the input signal to the CPU 901, and the like. The user who operates the information processing device 900 can input various types of data or instruct a processing operation to the information processing device 900 by manipulating the input apparatus 908. Note that the input apparatus 908 may be, for example, a remote control apparatus that uses infrared rays or other radio waves.

The output apparatus 909 is composed of an apparatus capable of visually or audibly reporting acquired information to the user. The output apparatus 909 can be, for example, a display apparatus such as an LCD, an organic electro luminescence (EL) display, a lamp, or the like, and an audio output apparatus such as a speaker, headphones, or the like. The output apparatus 909 can output results, obtained after processing by the information processing device 900, in the form of picture that includes text, image, or the like, or in the form of sound that includes voice, acoustic sound, or the like.

The storage apparatus 910 is a data storage apparatus configured as an example of a storage unit of the information processing device 900. The storage apparatus 910 may include a storage medium, a recording apparatus for recording data on the storage medium, a reading apparatus for reading data from the storage medium, and a deletion apparatus for deleting data recorded on the storage medium, or the like. The storage apparatus 910 is, for example, composed of a magnetic storage device such as a hard disk drive (HDD), a semiconductor storage device, an optical storage device, or the like. The storage apparatus 910 stores programs and various data executed by the CPU 901, various data acquired from the outside, and the like.

The drive 911 is a reader/writer for the removable recording medium 912 such as a magnetic disk, an optical disk, or a semiconductor memory, and is built in or externally attached to the information processing device 900. The drive 911 reads, for example, the information recorded in the attached removable recording medium 912, and outputs it to the RAM 903. In addition, the drive 911 also writes record into the attached removable recording medium 912.

The communication apparatus 913 is, for example, a communication interface composed of a communication device through which connection to a communication network is established, and the like. The communication apparatus 913 may be, for example, a communication card for a wired or wireless local area network (LAN), a Bluetooth (registered trademark), or a wireless USB (WUSB). In addition, the communication apparatus 913 may be a router for optical communication, a router for asymmetric digital subscriber line (ADSL), a modem for various types of communication, or the like. The communication apparatus 913 transmits and receives a signal or the like to and from the Internet and other communication devices using a predetermined protocol such as TCP/IP. In addition, the communication network connected to the communication apparatus 913 is a network connected by wire or wirelessly, and is, for example, the Internet, a home LAN, infrared communication, satellite communication, or the like.

Heretofore, an example of the hardware configuration of the information processing device 900 has been illustrated. Each of the structural elements described above may be a general-purpose member, or may be hardware specialized in the function of the corresponding structural element. Such a configuration can be appropriately changed depending on the technical level at the time of implementation.

7. Supplement

Note that, the embodiment of the present disclosure described above can include, for example, the information processing device or the information processing method executed by the information processing system described above, a program for functioning the information processing device, and a non-transitory tangible medium in which the program is recorded. In addition, the program may be distributed via a communication line (including wireless communication) such as the Internet.

In addition, the respective steps in the information processing method of the above-described embodiment of the present disclosure may not necessarily be processed in the described order. For example, the respective steps may be processed in an appropriately changed order. In addition, the respective steps may be partially processed in parallel or individually instead of being processed in time series. Further, processing of the respective steps may not be performed according to the described method, but may be performed according to another method by another functional unit, apparatus, or the like.

As described above, the favorable embodiments of the present disclosure have been described in detail with reference to the accompanying drawings, but the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

In addition, the effects described in the present specification are merely illustrative or exemplary and are not restrictive. That is, the technology according to the present disclosure can exhibit other effects obvious to those skilled in the art from the description of the present specification in addition to or in place of the above-described effects.

Note that the following configuration also belong to the technical scope of the present disclosure.

(1)
An information processing device comprising:
an information acquisition unit that acquires a transaction history between one or a plurality of electronic commerce business operators and a user;
a determination unit that determines whether the user satisfies a predetermined condition on the basis of the acquired transaction history; and
an incentive giving unit that gives the user a right to execute a game in which points can be given according to a result via an information processing terminal used by the user on the basis of a determination result.

(2)
The information processing device according to (1), further comprising a storage unit that stores the acquired transaction history in association with identification information.

(3)
The information processing device according to (2), wherein
the information acquisition unit acquires the transaction history from an information management apparatus managed by the electronic commerce business operator via an information aggregation apparatus.

(4)
The information processing device according to (3), wherein
the information acquisition unit acquires the transaction history associated with the identification information in the information aggregation apparatus.

(5)
The information processing device according to (4), wherein
the identification information includes a purchase confirmation e-mail address generated by the information aggregation apparatus, and
the purchase confirmation e-mail address is stored in the storage unit in association with a user e-mail address owned by the user.

(6)
The information processing device according to (5), wherein
the information aggregation apparatus includes:
an aggregation unit that aggregates the transaction histories by receiving an e-mail from each of the electronic commerce business operators to the purchase confirmation e-mail address,
a management unit that manages the aggregated transaction histories in association with the purchase confirmation e-mail address, and
a transfer unit that transfers the received e-mail.

(7)
The information processing device according to (6), further comprising a transmission unit that transmits the e-mail transferred from the information aggregation apparatus to an information processing terminal owned by the user using the user e-mail address associated with the purchase confirmation e-mail address.

(8)
The information processing device according to (4), wherein
the information aggregation apparatus includes:
an aggregation unit that aggregates the transaction histories from the information management apparatus using an account associated with the identification information, and
a management unit that manages the acquired transaction histories in association with the identification information.

(9)
The information processing device according to any one of (1) to (8), wherein the transaction history includes at least one of pieces of information of transaction date and time, transaction product, and transaction amount of a transaction performed by the user with the electronic commerce business operator.

(10)
The information processing device according to any one of (1) to (9), wherein the determination unit determines whether the user satisfies the predetermined condition on the basis of the predetermined condition set in advance.

(11)
The information processing device according to any one of (1) to (10), wherein the predetermined condition includes at least one of a period, a product, an amount of money, a number of products, and a condition for the electronic commerce business operator.

(12)

The information processing device according to any one of (1) to (11), wherein the information acquisition unit acquires a transaction history between a physical store and the user by using captured image data of a receipt.

(13)

The information processing device according to (1), wherein the information acquisition unit acquires influx route information transmitted from an information processing terminal owned by the user, and the determination unit determines whether the user satisfies a predetermined condition on the basis of the acquired influx route information.

(14)

The information processing device according to (13), wherein the influx route information includes code information transmitted from a user other than the user.

(15)

The information processing device according to (13), wherein the influx route information includes code information obtained from a site browsed by the user.

(16)

An information processing terminal that receives a right to execute a game in which points can be given according to a result when it is determined that a user satisfies a predetermined condition on the basis of a transaction history between one or a plurality of electronic commerce business operators and the user.

(17)

An information processing method comprising:

acquiring a transaction history between one or a plurality of electronic commerce business operators and a user;

determining whether the user satisfies a predetermined condition on the basis of the acquired transaction history; and giving the user a right to execute a game in which points can be given according to a result via an information processing terminal used by the user on the basis of a determination result.

REFERENCE SIGNS LIST 10, 10a INFORMATION PROCESSING SYSTEM
100 USER TERMINAL
110 DISPLAY UNIT
120, 220 INPUT UNIT
130, 230, 230a, 330, 330a, 530 STORAGE UNIT
140, 240, 240a, 340, 340a, 540 CONTROL UNIT
160, 260, 360, 560 COMMUNICATION UNIT
170 IMAGING UNIT
200, 200a SERVICE SERVER
232, 334 PURCHASE HISTORY DB
234 ACQUISITION CONDITION DB
236 ACCOUNT DB
238 CAMPAIGN DB
242, 242a, 342, 342a, 542 INFORMATION ACQUISITION UNIT
244, 244a, 544 DETERMINATION UNIT
246, 346 OUTPUT CONTROL UNIT
248, 348 TRANSFER UNIT
300, 300a AGGREGATION SERVER
332 E-MAIL ADDRESS DB
332a LOGIN ACCOUNT DB
350 GENERATION UNIT
400a, 400b, 400c EC BUSINESS OPERATOR SERVER
500 CODE MANAGEMENT SERVER
532, 532a, 532b CODE DB
548 ISSUE UNIT
600 RECEIPT
602, 604, 606, 700, 710, 720, 730, 740 DISPLAY SCREEN
702, 714, 722 BUTTON
712 DISPLAY COLUMN
732, 742 INPUT COLUMN
900 INFORMATION PROCESSING DEVICE
901 CPU
902 ROM
903 RAM
904 HOST BUS
905 BRIDGE
906 EXTERNAL BUS
907 INTERFACE
908 INPUT APPARATUS
909 OUTPUT APPARATUS
910 STORAGE APPARATUS
911 DRIVE
912 REMOVABLE STORAGE MEDIUM
913 COMMUNICATION APPARATUS

The invention claimed is:

1. An information processing device comprising:
an information acquisition unit, a determination unit, an incentive giving unit, an aggregation unit, a management unit, and a transfer unit which are each implemented via at least one processor, wherein
the information acquisition unit is configured to acquire a transaction history between one or a plurality of electronic commerce business operators and a user;
the determination unit is configured to determine whether or not the user satisfies a predetermined condition based on the acquired transaction history; and
the incentive giving unit is configured to give the user a right to execute a game in which points can be given according to a result via an information processing terminal used by the user based on a determination result,
the transaction history includes a referral code acquired from a uniform resource locator (URL) parameter of the one or the plurality of electronic commerce business operators and a date when the user accessed the URL, the URL parameter being transmitted via a network from an information processing terminal owned by the user,
the determination unit is further configured to determine whether the user satisfied the predetermined condition by comparing the referral code with a referral code stored on a storage unit implemented by a non-transitory computer-readable medium and comparing the date with an expiration date stored on the storage unit,
the information acquisition unit is further configured to
acquire the transaction history from an information management apparatus managed by an electronic commerce business operator via an information aggregation apparatus, and
acquire the transaction history associated with identification information in the information aggregation apparatus,
the information aggregation apparatus includes
the aggregation unit configured to aggregate the transaction histories from the information management apparatus by receiving an e-mail from each of the electronic commerce business operators to a purchase confirmation e-mail address and using an account associated with the identification information, the management unit configured to manage the aggregated transaction histories in association with the purchase confirmation e-mail address and the identification information, and the transfer unit configured to transfer the received e-mail.

2. The information processing device according to claim 1, further comprising the storage unit configured to store the acquired transaction history in association with the identification information.

3. The information processing device according to claim 2, wherein the identification information includes the purchase confirmation e-mail address generated by the information aggregation apparatus, and the purchase confirmation e-mail address is stored in the storage unit in association with a user e-mail address owned by the user.

4. The information processing device according to claim 3, further comprising a transmission unit configured to transmit the e-mail transferred from the information aggregation apparatus to an information processing terminal owned by the user using the user e-mail address associated with the purchase confirmation e-mail address, wherein the transmission unit is implemented via at least one processor.

5. The information processing device according to claim 1, wherein the transaction history includes at least one of pieces of information of transaction date and time, transaction product, and transaction amount of a transaction performed by the user with the electronic commerce business operator.

6. The information processing device according to claim 1, wherein the determination unit is further configured to determine whether or not the user satisfies the predetermined condition based on the predetermined condition set in advance.

7. The information processing device according to claim 1, wherein the predetermined condition includes at least one of a period, a product, an amount of money, a number of products, and a condition for the electronic commerce business operator.

8. The information processing device according to claim 1, wherein the information acquisition unit is further configured to acquire a transaction history between a physical store and the user by using captured image data of a receipt.

9. The information processing device according to claim 1, wherein the information acquisition unit is further configured to acquire influx route information transmitted from an information processing terminal owned by the user, and the determination unit is further configured to determine whether or not the user satisfies a predetermined condition based on the acquired influx route information.

10. The information processing device according to claim 9, wherein the influx route information includes code information transmitted from a user other than the user.

11. The information processing device according to claim 9, wherein the influx route information includes code information obtained from a site browsed by the user.

12. An information processing device comprising:

a communication unit implemented via at least one processor, wherein the communication unit is configured to receive a right to execute a game in which points can be given according to a result when it is determined that a user satisfies a predetermined condition based on a transaction history between one or a plurality of electronic commerce business operators and the user, the transaction history includes a referral code acquired from a uniform resource locator (URL) parameter of the one or the plurality of electronic commerce business operators and a date when the user accessed the URL, the URL parameter being transmitted via a network from an information processing terminal owned by the user, whether the user satisfied the predetermined condition is determined by comparing the referral code with a referral code stored on a storage unit implemented by a non-transitory computer-readable medium and comparing the date with an expiration date stored on the storage unit, the transaction history is acquired from an information management apparatus managed by an electronic commerce business operator via an information aggregation apparatus, the transaction history associated with identification information is acquired, the transaction histories are aggregated by receiving an e-mail from each of the electronic commerce business operators to a purchase confirmation e-mail address and using an account associated with the identification information, the aggregated transaction histories are managed in association with the purchase confirmation e-mail address and the identification information, and the received e-mail is transferred.

13. An information processing method comprising:

acquiring a transaction history between one or a plurality of electronic commerce business operators and a user;

determining whether the user satisfies a predetermined condition based on the acquired transaction history;

giving the user a right to execute a game in which points can be given according to a result via an information processing terminal used by the user based on a determination result, wherein the transaction history includes a referral code acquired from a uniform resource locator (URL) parameter of the one or the plurality of electronic commerce business operators and a date when the user accessed the URL, the URL parameter being transmitted via a network from an information processing terminal owned by the user;

determining whether the user satisfied the predetermined condition by comparing the referral code with a referral code stored on a storage unit implemented by a non-transitory computer-readable medium and comparing the date with an expiration date stored on the storage unit;

acquiring the transaction history from an information management apparatus managed by the electronic commerce business operator via an information aggregation apparatus;

acquiring the transaction history associated with identification information in the information aggregation apparatus;

aggregating the transaction histories from the information management apparatus by receiving an e-mail from each of the electronic commerce business operators to a purchase confirmation e-mail address and using an account associated with the identification information;
managing the aggregated transaction histories in association with the purchase confirmation e-mail address and the identification information; and
transferring the received e-mail.

* * * * *